United States Patent
Forsgren et al.

(10) Patent No.: US 11,995,846 B2
(45) Date of Patent: May 28, 2024

(54) THREE-DIMENSIONAL OBJECT TRACKING USING UNVERIFIED DETECTIONS REGISTERED BY ONE OR MORE SENSORS

(71) Applicant: Topgolf Sweden AB, Danderyd (SE)

(72) Inventors: Daniel Forsgren, Enebyberg (SE); Anton Mikael Jansson, Stockholm (SE); Stein Norheim, Spånga (SE)

(73) Assignee: Topgolf Sweden AB, Danderyd (SE)

( * ) Notice: Subject to any disclaimer, the term of this patent is extended or adjusted under 35 U.S.C. 154(b) by 330 days.

(21) Appl. No.: 17/516,637

(22) Filed: Nov. 1, 2021

(65) Prior Publication Data

US 2022/0138969 A1    May 5, 2022

Related U.S. Application Data

(60) Provisional application No. 63/109,290, filed on Nov. 3, 2020.

(51) Int. Cl.
    *G06T 7/292*    (2017.01)
    *G06T 7/246*    (2017.01)
    (Continued)

(52) U.S. Cl.
    CPC ............ *G06T 7/292* (2017.01); *G06T 7/251* (2017.01); *G06T 7/77* (2017.01); *G06V 10/255* (2022.01);
    (Continued)

(58) Field of Classification Search
    CPC ........... G06T 7/292; G06T 7/251; G06T 7/77; G06T 2207/10021; G06T 2207/10028;
    (Continued)

(56) References Cited

U.S. PATENT DOCUMENTS 5,938,545 A    8/1999  Cooper et al.
8,335,345 B2   12/2012 White et al.
(Continued)

FOREIGN PATENT DOCUMENTS

JP    5180733 B2 *  4/2013

OTHER PUBLICATIONS

S.-W. Joo and R. Chellappa, "A Multiple-Hypothesis Approach for Multiobject Visual Tracking," in IEEE Transactions on Image Processing, vol. 16, No. 11, pp. 2849-2854, Nov. 2007, doi: 10.1109/TIP.2007.906254. (Year: 2007).*

(Continued)

*Primary Examiner* — Sean M Conner
*Assistant Examiner* — Stefano Anthony Dardano
(74) *Attorney, Agent, or Firm* — Fish & Richardson P.C.

(57) ABSTRACT

Methods, systems, and apparatus, including medium-encoded computer program products, for three-dimensional object tracking includes, in at least one aspect, a method including: obtaining three-dimensional positions of objects registered by a detection system configured to allow more false positives so as to minimize false negatives, forming hypotheses using a filter that allows connections between registered objects when estimated three-dimensional velocity vectors roughly correspond to an object in motion in three-dimensional space, eliminating a proper subset of the hypotheses that are not further extended during the forming, specifying at least one three-dimensional track of at least one ball in motion in three-dimensional space by applying a full three-dimensional physics model to data for the three-dimensional positions used in the forming of at least one hypothesis that survives the eliminating, and outputting for display the at least one three-dimensional track of the at least one ball in motion in three-dimensional space.

30 Claims, 11 Drawing Sheets

(51) Int. Cl.
*G06T 7/77* (2017.01)
*G06V 10/20* (2022.01)
*G06V 20/52* (2022.01)
*G06V 20/64* (2022.01)

(52) U.S. Cl.
CPC ............ *G06V 20/52* (2022.01); *G06V 20/647* (2022.01); *G06T 2207/10021* (2013.01); *G06T 2207/10028* (2013.01); *G06T 2207/20084* (2013.01); *G06T 2207/30224* (2013.01); *G06T 2207/30241* (2013.01)

(58) Field of Classification Search
CPC . G06T 2207/20084; G06T 2207/30224; G06T 2207/30241; G06V 10/255; G06V 20/52; G06V 20/647; G01S 13/723; G01S 13/867; A63B 24/0021; A63B 2024/0028
See application file for complete search history.

(56) References Cited

U.S. PATENT DOCUMENTS

| | | | |
|---|---|---|---|
| 8,670,604 | B2 | 3/2014 | Eggert et al. |
| 9,036,864 | B2 | 5/2015 | Johnson et al. |
| 9,283,464 | B2 | 3/2016 | Nipper et al. |
| 10,444,339 | B2 | 10/2019 | Tuxen et al. |
| 10,596,416 | B2 | 3/2020 | Forsgren |
| 10,751,569 | B2 | 8/2020 | Guerci et al. |
| 10,765,944 | B2 | 9/2020 | Dantas De Castro |
| 10,803,598 | B2 | 10/2020 | Chaurasia et al. |
| 10,898,757 | B1 | 1/2021 | Johansson et al. |
| 10,987,566 | B2 | 4/2021 | Ferras |
| 10,989,791 | B2 | 4/2021 | Tuxen et al. |
| 11,537,819 | B1* | 12/2022 | Das .................. G06F 18/24 |
| 2008/0240497 | A1* | 10/2008 | Porikli .............. G06T 7/20 382/103 |
| 2014/0163915 | A1* | 6/2014 | Baek .................. G06T 7/254 702/95 |
| 2016/0110913 | A1 | 4/2016 | Kosoy et al. |
| 2016/0193501 | A1 | 7/2016 | Nipper et al. |
| 2016/0306036 | A1 | 10/2016 | Johnson |
| 2018/0197296 | A1 | 7/2018 | Liu et al. |
| 2018/0357472 | A1 | 12/2018 | Dreessen |
| 2020/0143094 | A1 | 5/2020 | Haaland et al. |
| 2020/0164258 | A1 | 5/2020 | Tuxen |
| 2020/0391077 | A1 | 12/2020 | Forsgren |
| 2021/0069569 | A1 | 3/2021 | Oh et al. |
| 2021/0220718 | A1 | 7/2021 | Tuxen et al. |
| 2021/0264141 | A1 | 8/2021 | Chojnacki |
| 2021/0275873 | A1 | 9/2021 | Johansson et al. |

OTHER PUBLICATIONS

Jansson, Anton. "Predicting trajectories of golf balls using recurrent neural networks." (2017). (Year: 2017).*
Ren, Jinchang, et al. "Real-time modeling of 3-D soccer ball trajectories from multiple fixed cameras." IEEE Transactions on Circuits and Systems for Video Technology 18.3 (2008): 350-362. (Year: 2008).*
Botha, Frik J., Corne E. van Daalen, and Johann Treurnicht. "Data fusion of radar and stereo vision for detection and tracking of moving objects." 2016 Pattern Recognition Association of South Africa and Robotics and Mechatronics International Conference (PRASA-RobMech). IEEE, 2016. (Year: 2016).*
Ishii et al., "3D Tracking of a Soccer Ball Using Two Synchronized Cameras", University of Tsukuba, Graduate School of System and Information Engineering, Dec. 2007, 11 pages.
Ankur Handa, "Analysing High Frame-Rate Camera Tracking", Imperial College London, Department of Computing, Sep. 2013, 224 pages.
Denny Britz, "WILDML Artificial Intelligence, Deep Learning, and NPL", Recurrent Neural Networks Tutorial, Part 1—Introduction to RNNs—WildML, www.wildml.com/2015/09/recurrent-neural-networks-tutorial-part-1-intruduction-to-rnns, Oct. 22, 2020, 16 pages.
Peter Sodergren, "High accuracy stereo Structure from Motion through symmetry cost functions", KTH Computer Science and Communication, Master's Thesis at CSC, Apr. 14, 2014, 81 pages.
Wikipedia, "Kalman filter", https://en.wikipedia.org/wiki/Kalman_filter, Nov. 2, 2020, 37 pages.
Birbach et al., "A multiple hypothesis approach for a ball tracking system," International Conference on Computer Vision Systems, Oct. 2009, 11 pages.
Birbach et al., "Estimation and prediction of multiple flying balls using probability hypothesis density filtering," IEEE/RSJ International Conference on Intelligent Robots and Systems, Sep. 2011, 8 pages.
International Search Report and Written Opinion in International Appln. No. PCT/EP2021/079919, dated Feb. 9, 2022, 16 pages.
Jansson, "Predicting Trajectories of Golf Balls Using Recurrent Neural Networks," Thesis for the degree of Master in Computer Science, KTH Royal Institute of Technology, School of Computer Science and Communication, Jun. 2017, 124 pages.
Kamble et al., "Ball tracking in sports: a survey," Artificial Intelligence Review, Oct. 2017, 52: 51 pages.

* cited by examiner

THREE-DIMENSIONAL OBJECT TRACKING USING UNVERIFIED DETECTIONS REGISTERED BY ONE OR MORE SENSORS

CROSS-REFERENCE TO RELATED APPLICATIONS

This application claims the benefit under 35 U.S.C. § 119(e) of U.S. Patent Application No. 63/109,290, entitled "THREE-DIMENSIONAL OBJECT TRACKING USING UNVERIFIED DETECTIONS REGISTERED BY ONE OR MORE SENSORS", filed Nov. 3, 2020.

BACKGROUND

This specification relates to tracking an object in motion, such as a golf ball in flight, using data obtained from different sensors, which can employ different sensor technologies.

Systems and methods for tracking the flight of a golf shot with sensors include launch monitors, full flight two-dimensional (2D) tracking, and full flight three-dimensional (3D) tracking. Commonly used sensor types are cameras, Doppler radar, and phased array radar. The launch monitor method is based on measuring a set of parameters that can be observed during the swing of the golf club and the first few inches of ball flight after the club has impacted the ball. The measured parameters are then used to extrapolate an expected ball flight using mathematics and physics modeling.

In contrast, full flight 3D tracking systems are characterized by a design that attempts to track the full flight of the golf shot, rather than extrapolating from launch parameters. In addition, full flight 2D tracking systems track the shape of a golf shot, as seen from a particular angle, but will not produce 3D information and generally cannot be used to determine key parameters, such as the distance the ball traveled. Full flight 3D tracking using a combination of camera and Doppler radar data has been described in U.S. Pat. No. 10,596,416. Finally, full flight 3D tracking using stereo cameras that have their image frame acquisitions synchronized with each other has been described as potentially usable in some contexts for 3D tracking of objects.

SUMMARY

This specification describes technologies relating to tracking an object in motion in three-dimensional (3D) space, such as a golf ball in flight, using data obtained from two or more sensors, such as cameras, radar devices, or a combination thereof. The 3D object tracking uses unverified object detections registered by the two or more sensors. By allowing more false positives of detected objects to be used as inputs to 3D tracking in 3D space, the number of false negatives of detected objects can be minimized, thus helping to ensure that a small object (e.g., a golf ball) will still be detected even when its distance from (and/or relative speed with respect to) a sensor makes it difficult for the sensor to obtain enough data to accurately detect the object.

But this use of many false positives means that most of the 3D data input to the 3D tracking system (e.g., at least 95%, at least 96%, at least 97%, at least 98%, or at least 99%) will not actually be accurate detections of the object, and this can overload the ability of a 3D tracking system to find the actual objects in motion in 3D space in real time, absent the systems and techniques described in this document for doing motion analysis in a 3D cloud of unverified detections of objects to be tracked. Note that the false positives can include false sensor detections that are not in fact an object to be tracked (e.g., 90% or more of the data from each camera that identifies potential golf balls will in fact not be golf balls, e.g., just noise in the signal or other objects that are not golf balls) as well as false combinations of data that are not in fact one object (e.g., 50% or more of the pairings of object detections from different cameras or the pairings of object detections from a camera sensor and a radar device, or other sensor, will be incorrect, e.g., only the data from one of the sensors is in fact a golf ball, or the data from both sensors are a golf ball, but not the same golf ball). Nonetheless, the systems and techniques described in this document can accurately identify objects in motion in 3D space despite the input 3D data including many false detections of the objects and many false pairings of data from the sensors used to detect the objects.

In general, one or more aspects of the subject matter described in this specification can be embodied in one or more methods (and also one or more non-transitory computer-readable mediums tangibly encoding instructions that cause data processing apparatus associated with an object detection system comprising two or more sensors to perform operations) including: obtaining three-dimensional positions of objects of interest registered by an object detection system configured to allow more false positives for the registered objects of interest so as to minimize false negatives; forming hypotheses of objects in motion in three-dimensional space using a filter applied to the three-dimensional positions of the registered objects of interest, wherein the filter allows connections between specific ones of the registered objects of interest when estimated three-dimensional velocity vectors for the specific objects of interest roughly correspond to an object in motion in three-dimensional space across time; eliminating a proper subset of the hypotheses that are not further extended by connections made, during the forming, with at least one additional object of interest registered by the object detection system; specifying at least one three-dimensional track of at least one ball in motion in three-dimensional space by applying a full three-dimensional physics model to data for the three-dimensional positions of the registered objects of interest used in the forming of at least one hypothesis that survives the eliminating; and outputting for display the at least one three-dimensional track of the at least one ball in motion in three-dimensional space.

Other embodiments of this aspect include corresponding systems, apparatus, and computer program products recorded on one or more computer storage devices, each configured to perform the actions of the methods. Thus, one or more aspects of the subject matter described in this specification can be embodied in one or more systems including: two or more sensors (e.g., a hybrid camera-radar sensor, at least one camera and at least one radar device, a stereo camera, multiple cameras that can form various stereo camera pairs, etc.) and one or more first computers of an object detection system configured to register objects of interest and to allow more false positives for the registered objects of interest so as to minimize false negatives; and one or more second computers configured to perform operations in accordance with the one or more methods. The foregoing and other embodiments can optionally include one or more of the following features, alone or in combination.

Forming the hypotheses of objects in motion in three-dimensional space using the filter can include: using a first model of motion in three-dimensional space when a number of registered detections for a given hypothesis is less than a threshold value, wherein the first model has a first level of complexity; and using a second model of motion in three-dimensional space when the number of registered detections for the given hypothesis is greater than or equal to the threshold value, wherein the second model has a second level of complexity that is greater than the first level of complexity of the first model. The first model of motion in three-dimensional space can be a linear model that connects a first three-dimensional position of a registered object of interest to the given hypothesis when the first three-dimensional position extends the given hypothesis in roughly a same direction predicted by the given hypothesis, and the second model of motion in three-dimensional space can be a recurrent neural network model that has been trained to make short term predictions of motion in three-dimensional space.

Forming the hypotheses of objects in motion in three-dimensional space can include: predicting a next three-dimensional position for a registered detection for the given hypothesis using the first model or the second model, in accordance with the number of registered detections for the given hypothesis and the threshold value; searching a spatial data structure containing all of the three-dimensional positions of objects of interest registered by the object detection system for a next time slice to find a set of three-dimensional positions within a predefined distance of the predicted next three-dimensional position; using the predicted next three-dimensional position for the given hypothesis when the set of three-dimensional positions is a null set; using a single three-dimensional position for the given hypothesis when the set of three-dimensional positions contains only the single three-dimensional position; and when the set of three-dimensional positions contains two or more three-dimensional positions, sorting the two or more three-dimensional positions based on proximity to the predicted next three-dimensional position to form a sorted set, removing any less proximate three-dimensional positions in the sorted set beyond a predefined threshold number greater than two, and branching the given hypothesis into two or more hypotheses in a group of hypotheses using the two or more three-dimensional positions remaining in the sorted set.

Forming the hypotheses of objects in motion in three-dimensional space when the number of registered detections for the given hypothesis is greater than or equal to the threshold value can include: identifying a data point in the given hypothesis that has a local minimum vertical position; checking respective vertical components of estimated three-dimensional velocity vectors before and after the data point in the given hypothesis; and designating the data point as a ground impact when a first of the respective vertical components is negative and a second of the respective vertical components is positive.

The respective vertical components can be from averages of the estimated three-dimensional velocity vectors before and after the data point in the given hypothesis, and the method can include: selecting at least one time window based on a noise level associated with the estimated three-dimensional velocity vectors, a minimum expected flight time on one or both sides of the data point, or both the noise level and the minimum expected flight time; and computing the averages of the estimated three-dimensional velocity vectors before and after the data point that fall within the at least one time window.

Forming the hypotheses of objects in motion in three-dimensional space when the number of registered detections for the given hypothesis is greater than or equal to the threshold value can include dividing the given hypothesis into distinct segments including a flight segment, one or more bounce segments, and a roll segment, and the dividing can include the identifying, the checking, the designating, and: classifying a first segment of the given hypothesis before a first designated ground impact as the flight segment; classifying a next segment of the given hypothesis after each next designated ground impact as one of the one or more bounce segments when an angle between a first estimated velocity vector before the next designated ground impact and a second estimated velocity vector after the next designated ground impact is greater than a threshold angle; and classifying the next segment of the given hypothesis after a next designated ground impact as the roll segment when the angle between the first estimated velocity vector before the next designated ground impact and the second estimated velocity vector after the next designated ground impact is less than or equal to the threshold angle.

The given hypothesis can be the at least one hypothesis that survives the eliminating, and specifying the at least one three-dimensional track of the at least one ball in motion in three-dimensional space can include: generating the data for the three-dimensional positions of the registered objects used in the forming of the at least one hypothesis by triangulating a more accurate 3D path using sensor observations registered by the object detection system in at least the flight segment; and confirming the at least one ball in motion by applying the full three-dimensional physics model to the generated data for at least the flight segment.

The obtaining can include receiving or generating the three-dimensional positions of the registered objects of interest in which a majority of the registered objects of interest are false positives including false detections by individual sensors and false combinations of detections from respective ones of the individual sensors. The individual sensors can include three or more sensors, and the obtaining can include generating the three-dimensional positions by making respective combinations of the detections from respective pairs of the three or more sensors for a current time slice. The three or more sensors can include two cameras and a radar device, and the making can include: combining detections of a single object of interest by the two cameras using a stereo pairing of the two cameras to generate a first three-dimensional position of the single object of interest; and combining detections of the single object of interest by the radar device and at least one of the two cameras to generate a second three-dimensional position of the single object of interest. Moreover, the three or more sensors can include an additional camera, and the making can include combining detections of the single object of interest by the additional camera and the two cameras using stereo pairings of the additional camera with each of the two cameras to generate a third three-dimensional position of the single object of interest and a fourth three-dimensional position of the single object of interest.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
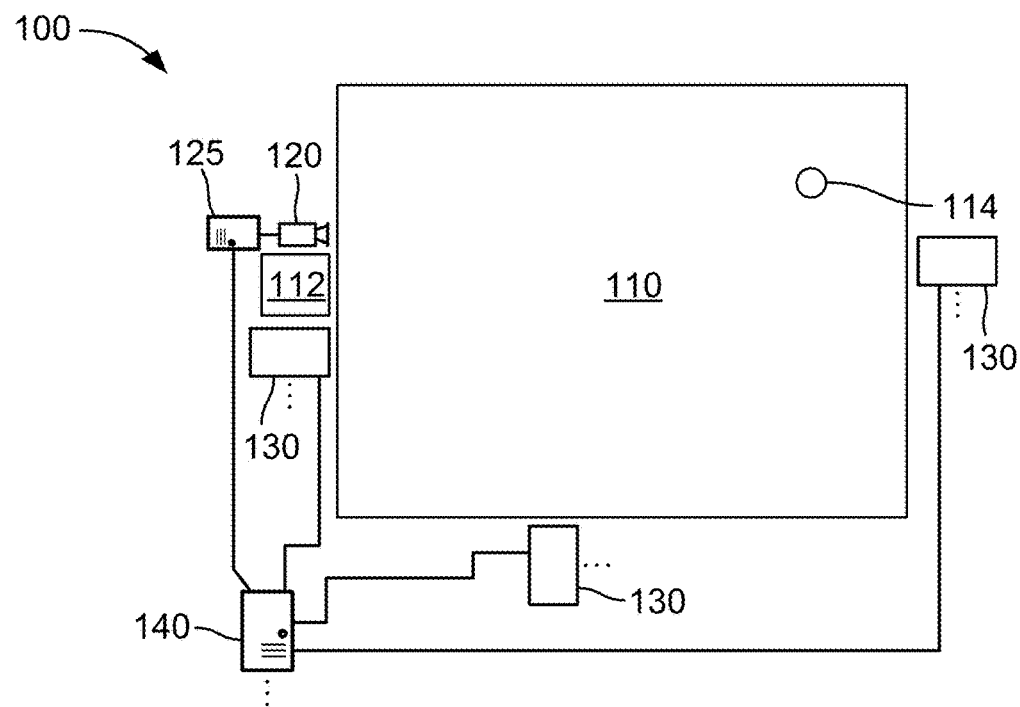
FIG. 1A shows an example of a system that performs motion based preprocessing of two-dimensional (2D) image data followed by three-dimensional (3D) object tracking of an object in motion through a three dimensional space.

FIG. 1A shows an example of a system 100 that performs motion based preprocessing of two-dimensional (2D) image data followed by three-dimensional (3D) object tracking of an object in motion through a 3D space 110. The object to be tracked can be a golf ball or another type of object that is struck, kicked or thrown (e.g., a baseball, a soccer ball, or a football/rugby ball). In some implementations, the 3D space 110 is a golf range, a grass field, or another open area into which objects can be launched. For example, the 3D space 110 can be part of a golf entertainment facility that includes one or more targets 114, a building including golf bays, each including at least one tee area 112 (more generally, a launch area 112), and potentially other entertainment as well as dining options.

In some implementations, the 3D space 110 is a playing area for a sport, such as a golf course, where the launch area 112 can be the golf tee for a particular hole on the golf course, or an intermediate landing point for a golf ball in play on the course, and the target 114 can be the cup at the end of the particular hole on the golf course or an intermediate landing point for a golf ball in play on the course. Other implementations are also possible, such as the launch area 112 being one of multiple designated tee areas along a tee line where golfers can hit golf balls into an open field 110, or the launch area 112 being one of multiple designated tee areas in the stands at a sports stadium where golfers can hit golf balls over and onto the playing field 110 of the sports stadium.

The system 100 includes two or more sensors 130, including at least one camera 120 and its associated computer 125. One or more of the sensors 130 (including the at least one camera 120 and its associated computer 125) can be located close to the launch area 112 for the object to be tracked, but this need not be the case. In some implementations, one or more sensors 130 (including the camera 120 and computer 125) can be located along one or both sides of the 3D space 110, and/or on the other side of the 3D space 110 opposite the launch area 112. For example, at a golf tournament, the camera 120 and computer 125 can be located behind the green, looking back at the golfer, assuming that shots will be hit towards the green. Thus, in various implementations, the sensors 130 can observe and track objects that move away from a sensor 130, toward a sensor 130, and/or through the field of view of a sensor 130 (note that each set of three dots in sequence in a figure indicates one or more additional instances of the sensor, computer, communications channel, etc. can also be included).

Figure 1B:
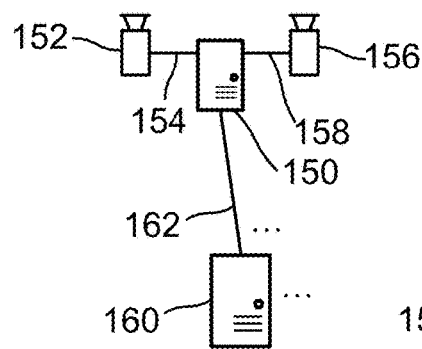
FIGS. 1B-1D show examples of different sensor and computer configurations, as can be used in the system of FIG. 1A.
Figure 1C:
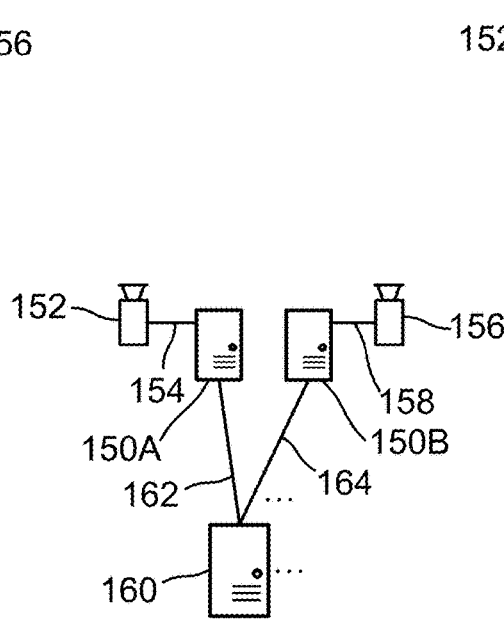
Figure 1D:
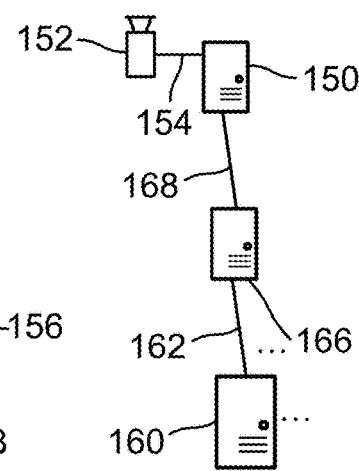

The sensors 130 can include cameras (e.g., stereo camera pairs), radar devices (e.g., single antenna Doppler radar devices), or combinations thereof, including potentially a hybrid camera-radar sensor unit, as described in U.S. Pat. No. 10,596,416. Nonetheless, at least one of the sensors 130 is a camera 120 and its associated computer 125, which are connected by a communications channel. FIGS. 1B-1D show examples of different sensor and computer configurations, as can be used in the system of FIG. 1A.

FIG. 1B shows an example of a pair of cameras 152, 156 that are connected to a first computer 150 through first communications channels 154, 158 having a first data bandwidth that is higher than that of at least one other communications channel used in the system. For example, the first communications channels 154, 158 can employ one or more high bandwidth, short distance data communication technologies, such as Universal Serial Bus (USB) 3.0, Mobile Industry Processor Interface (MIPI), Peripheral Component Interconnect eXtended (PCIx), etc. As described in further detail below, the pre-processing of image data from camera(s) 152, 156 can be performed close to the camera at one or more first computers 150, and once the pre-processing at the first computer(s) 150 has reduced the data bandwidth, the output of this pre-processing can be sent over a second communications channel 162 having a second data bandwidth that is less than the first data bandwidth. Thus, the second communications channel 162 can employ one or more lower bandwidths, longer distance data communication technologies, such as copper Ethernet or wireless data connections (e.g., using WiFi and/or one or more mobile phone communication technologies).

This is significant because it allows the system to be implemented with higher resolution camera(s) 120, 152, 156 and with computer(s) 125, 150 that operate on raw image (uncompressed) data from these camera(s) 120, 152, 156. Note that, whether using stereo camera tracking or hybrid camera/radar tracking, using a higher resolution camera with a higher frame rate enables higher quality 3D tracking, but only if the data can be efficiently and effectively processed. Furthermore, if the object tracking is intended to work for very small objects (e.g., the object may show up in only a single pixel of even a high resolution camera image) the object detection may need to have access to raw image (uncompressed) data since using traditional lossy video compression techniques (MPEG and similar) may remove valuable information about small objects from the images.

To address these issues, the first computer(s) 150 can perform pre-processing on the image data (including object detection and optionally 2D tracking) close to the camera(s) 152, 156 to reduce the bandwidth requirements for sending sensor data to one or more second computers 160 over the second communications channel 162. In addition, the preprocessing (as described in this document) enables downstream (post image capture) virtual time synchronization of measured object positions in time and space, allowing 3D tracking to be performed at second computer(s) 160 using the data received over the one or more second communication channels 162. This allows the downstream processing to be readily performed at a remote server because, after the pre-processing, the data bandwidth is so low that it is trivial to send the data over long distances.

Note that this can provide significant advantages when setting up the system 100 due to the flexibility it provides. For example, in the case of a golf competition television (TV) broadcast, where the system 100 can be used to track golf balls through the 3D space of the golf course and overlay a trace of the golf ball in a TV signal produced for live transmission, or for recording, the sensors 130 may be deployed a mile or more from the TV production facilities (where the 3D tracking computer 160 may be positioned). Note that the translation of ball positions (identified during the 3D tracking) to corresponding positions in video data obtained by the TV camera (allowing the trace overlay of a graphical representation of the ball's flight path onto the video data) can be performed using known homography techniques. As another example, in the case of a golf entertainment facility, the 3D tracking computer (e.g., a server computer 140, 160) need not be located in the same facility, and the 3D tracking performed by this computer (e.g., to augment other data or media, such as showing the path of the golf ball in a computer representation of the physical environment in which the golfer is located, or in a virtual environment that exists only in the computer) can be readily transferred to another computer (e.g., failover processing).

Various sensor and computer configurations are possible. FIG. 1C shows an example in which each camera 152, 156 has a dedicated first computer 150A, 150B, and the computers 150A, 150B communicate their respective, pre-processed data to the second computer(s) 160 over separate, second communication channels 162, 164. Thus, the cameras (or other sensor technology) can either share or not share first computer resources. In addition, the pre-processing can be split up and performed at different computers.

FIG. 1D shows an example in which the camera 152 is coupled with the computer 150 over a first communications channel 154 having a first data bandwidth, the first computer 150 is coupled with a third computer 166 over a third communications channel 168 having a third data bandwidth, and the third computer 166 is coupled with the second computer 160 over the second communications channel 162 having the second data bandwidth, where the second data bandwidth is less than the first data bandwidth, and the third data bandwidth that is less than the first data bandwidth but more than the second data bandwidth. The first computer 150 performs the object detection, the third computer 166 performs the 2D tracking of the object, and the second computer 160 performs the virtual time synchronization and 3D tracking of the object. Moreover, in some implementations, the first computer 150 performs the object detection and pre-tracking in 2D (using very simple/loose constraints), the third computer 166 performs more thorough 2D tracking, and the second computer 160 performs the virtual time synchronization and 3D tracking of the object.

Other sensor and computer configurations are also possible, consistent with the disclosure of this document. For example, the first computer 150 can perform the object detection (with pre-tracking in 2D (using very simple/loose constraints) or with no 2D tracking of the object), and a same second computer 160 can perform 2D tracking of the object (more thorough 2D tracking after a pre-tracking in 2D or all 2D tracking), the virtual time synchronization and 3D tracking of the object, rather than using an intermediate third computer 166 to perform the 2D tracking of the object. Conversely, one or more further intermediate computers can be used in some implementations. For example, the system can employ four separate computers to perform each of the following four operations: object detection, 2D tracking, virtual time synchronization, and 3D tracking. As another example, the system can employ five separate computers to perform each of the following five operations: object detection, pre-tracking in 2D (using very simple/loose constraints), more thorough 2D tracking, virtual time synchronization, and 3D tracking. Other configurations are possible, provided that at least one of the operations occurs at a first computer communicatively coupled with at least one camera through a first communications channel, and at least one other of the operations occurs at a second computer communicatively coupled with the first computer through a second communications channel having a data bandwidth that is less than the data bandwidth of the first communications channel.

Figure 2:
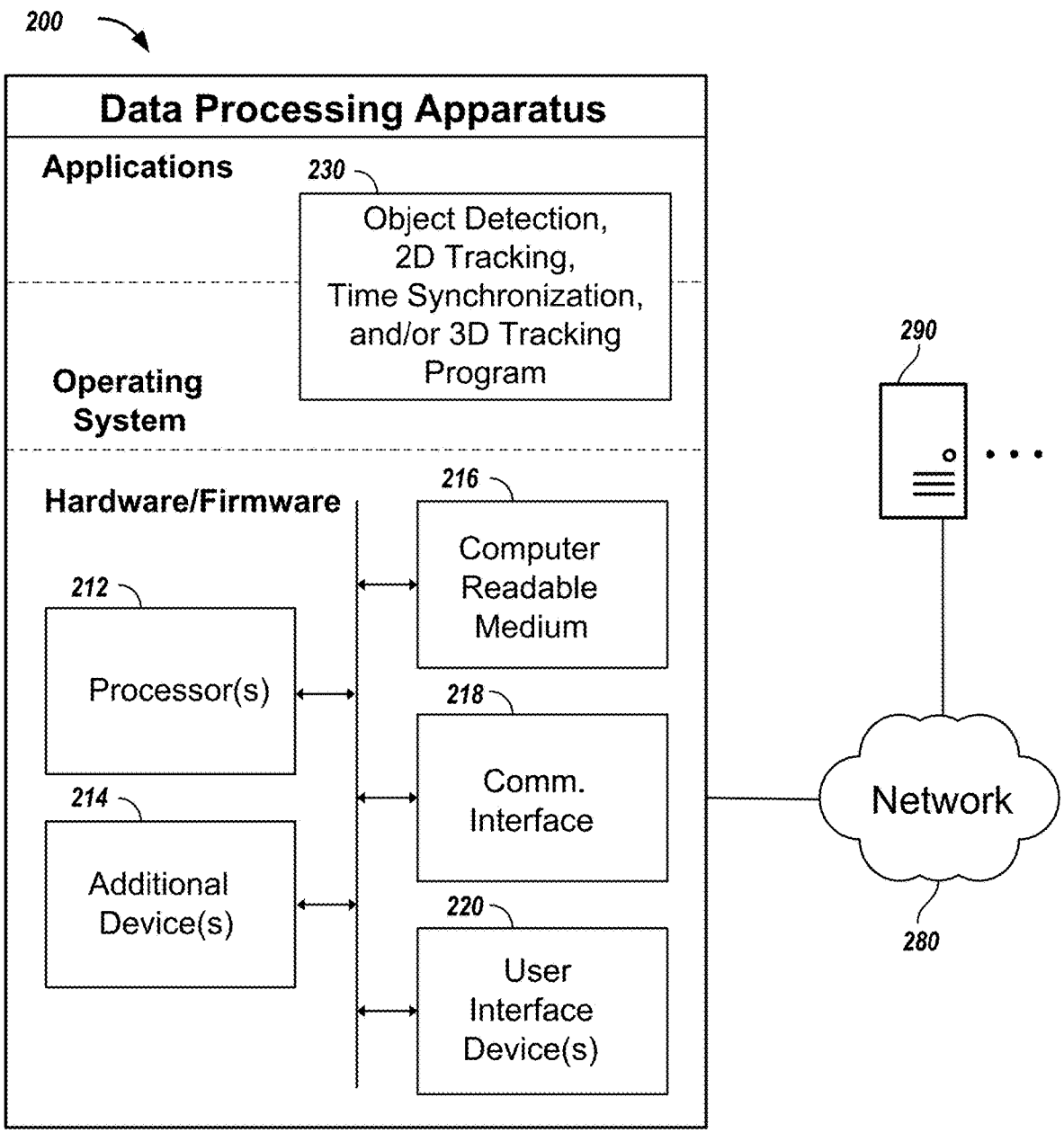
FIG. 2 is a schematic diagram of a data processing system including a data processing apparatus.

Various types of computers can be used in the system. The essential elements of a computer are a processor for performing instructions and one or more memory devices for storing instructions and data. As used herein, a "computer" can include a server computer, a client computer, a personal computer, embedded programmable circuitry, or a special purpose logic circuitry. FIG. 2 is a schematic diagram of a data processing system including a data processing apparatus 200, which represents an implementation of a first computer 150, a second computer 160, or a third computer 166. The data processing apparatus 200 can be connected with one or more computers 290 through a network 280.

The data processing apparatus 200 can include various software modules, which can be distributed between an applications layer and an operating system. These can include executable and/or interpretable software programs or libraries, including a program 230 that operates as an object detection program (e.g., in first computer 150), a 2D tracking program (e.g., in first computer 150 and/or third computer 166), a virtual time synchronization program (e.g., in second computer 160), and/or a 3D tracking program (e.g., in second computer 160), as described in this document. The number of software modules used can vary from one implementation to another. Also, in some cases, e.g., a 2D tracking program 230, the program 230 can be implemented in embedded firmware, and in other cases, e.g., a time synchronization and 3D tracking program 230, the program 230 can be implemented as software modules that are distributed on one or more data processing apparatus connected by one or more computer networks or other suitable communication networks.

The data processing apparatus 200 can include hardware or firmware devices including one or more hardware processors 212, one or more additional devices 214, a non-transitory computer readable medium 216, a communication interface 218, and one or more user interface devices 220. The processor 212 is capable of processing instructions for execution within the data processing apparatus 200, such as instructions stored on the non-transitory computer readable medium 216, which can include a storage device such as one of the additional devices 214. In some implementations, the processor 212 is a single or multi-core processor, or two or more central processing units (CPUs). The data processing apparatus 200 uses its communication interface 218 to communicate with one or more computers 290, for example, over the network 280. Thus, in various implementations, the processes described can be run in parallel or serially, on a single or multi-core computing machine, and/or on a computer cluster/cloud, etc.

Examples of user interface devices 220 include a display, a touchscreen display, a speaker, a microphone, a tactile feedback device, a keyboard, and a mouse. Moreover, the user interface device(s) need not be local device(s) 220, but can be remote from the data processing apparatus 200, e.g., user interface device(s) 290 accessible via one or more communication network(s) 280. The data processing apparatus 200 can store instructions that implement operations as described in this document, for example, on the non-transitory computer readable medium 216, which can include one or more additional devices 214, for example, one or more of a floppy disk device, a hard disk device, an optical disk device, a tape device, and a solid state memory device (e.g., a RAM drive). Moreover, the instructions that implement the operations described in this document can be downloaded to the non-transitory computer readable medium 216 over the network 280 from one or more computers 290 (e.g., from the cloud), and in some implementations, the RAM drive is a volatile memory device to which the instructions are downloaded each time the computer is turned on.

Further, while the 3D object tracking of the present disclosure can employ the pre-processing of sensor data, the 2D object tracking, and the virtual time synchronization described in this document (and in U.S. Provisional Application No. 63/065,872, filed 14 Aug. 2020, and U.S. application Ser. No. 17/404,953, filed 17 Aug. 2021, both tiled, "Motion Based Pre-Processing of Two-Dimensional Image Data Prior to Three-Dimensional Object Tracking With Virtual Time Synchronization") and thus the 3D object tracking system and techniques of the present disclosure can gain the attendant advantages of the data pre-processing, 2D object tracking, and virtual time synchronization systems and techniques when implemented therewith, in some implementations, these systems and techniques for obtaining three-dimensional positions of objects of interest registered by an object detection system need not be used. One or more other object detection systems can be used with the 3D object tracking described in further detail in connection with FIGS. 7-10B.

Figure 3:
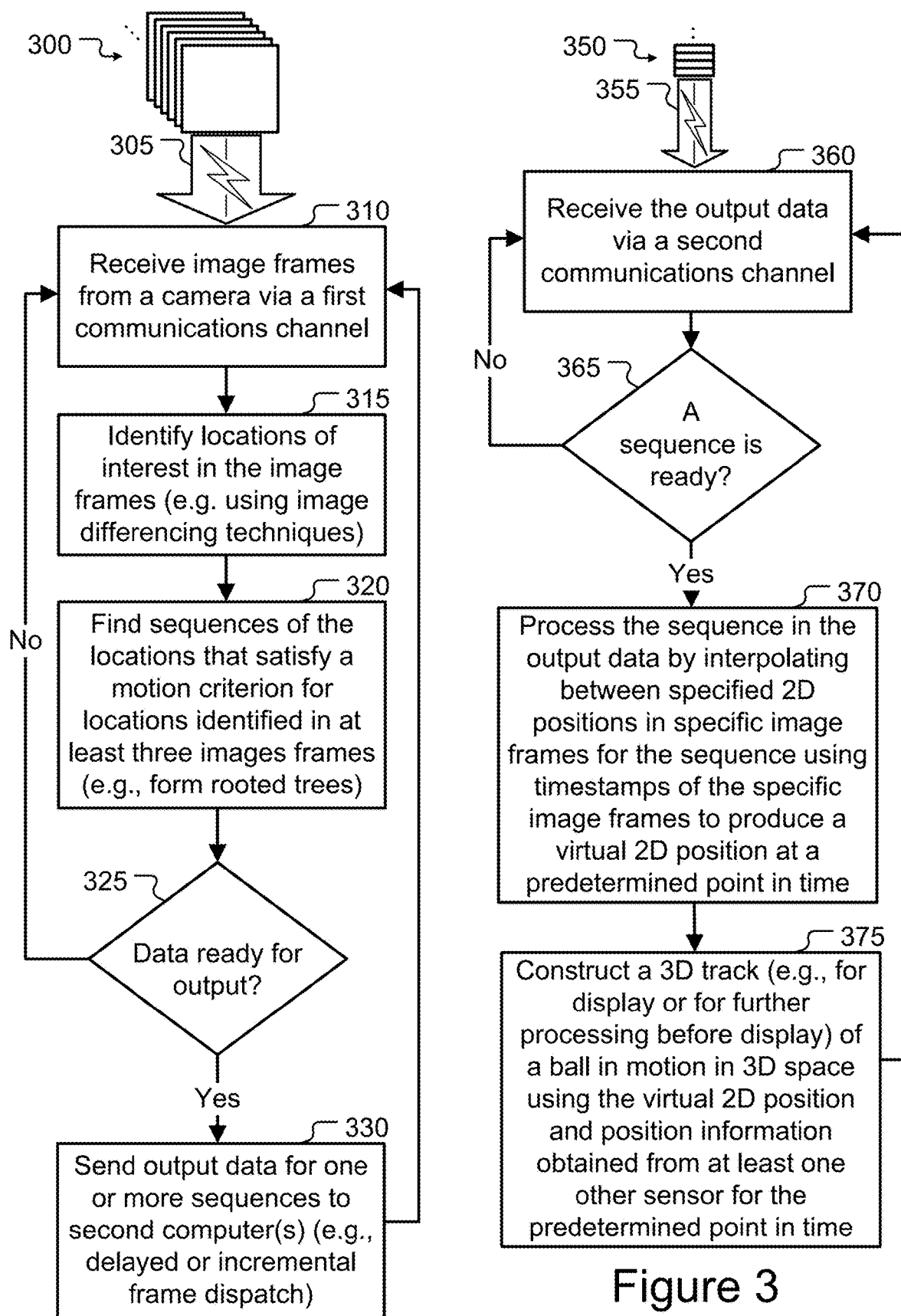
FIG. 3 shows an example of processes performed at different computers to detect objects, track the objects in 2D, produce virtual 2D positions for time synchronization, and construct 3D tracks of the objects in motion.

FIG. 3 shows an example of processes performed at different computers to detect objects, track the objects in 2D, produce virtual 2D positions for time synchronization, and construct 3D tracks of the objects in motion. The processes of FIG. 3 include pre-processing operations 310-330 performed at one or more first computers (e.g., computers 125, 150, 166 in FIGS. 1A-1D) and additional processing operations 360-375 performed at one or more second computers (e.g., computers 140, 160 in FIGS. 1A-1D). The pre-processing operations can include object detection and 2D tracking that effectively compresses ball location data (to reduce the bandwidth requirements for sending data to be used in 3D tracking) in a manner that enables virtual time synchronization of measured object positions during the additional processing at the second computer(s).

Thus, image frames 300 are received 310 (e.g., by a computer 125, 150) from a camera via a first communications channel 305 coupling the camera with the first computer(s), where the first communications channel 305 through which the image frames 300 are received has a first data bandwidth. For example, the first communications channel 305 can be a USB 3.0, MIPI, or PCIx communications channel, e.g., communications channel(s) 154, 158. Note that the bandwidth requirement between the camera and the computer can readily exceed 1 Gigabits per second (Gbps), e.g., a 12 megapixel (MP) camera running at 60 frames per second (FPS) and 12 bits per pixel needs a bandwidth of more than 8 Gbps.

Moreover, multiple such cameras used in combination may require a total bandwidth of 10-100 Gbps, which would put a serious strain even on Ethernet communication hardware. Furthermore, stereo setups (e.g., stereo cameras 152, 156 in FIG. 1B) sometimes require a significant distance between the cameras, or between the cameras and computer infrastructure, such as server rooms or cloud based computing, making high bandwidth communication even more challenging when long cables and/or communication over internet is required. As noted above, traditional video compression techniques, such as MPEG technology, may not be a suitable way of reducing bandwidth, especially when tiny objects (e.g., a distant golf ball) are to be tracked, since the objects to be tracked are at risk of being removed by traditional video compression. Thus, a high bandwidth communications channel 305 is used (for video frames from one or more cameras) allowing high resolution, high bit depth, and/or uncompressed image data to be received 310 as input to the object detection process.

Locations of interest are identified 315 (e.g., by a computer 125, 150) in the received image frames. For example, this can involve using image differencing techniques to identify each location in an image frame that has one or more image data values that change by more than a threshold amount from a prior image frame. In addition, other approaches are also possible. For example, the process can look for groups of pixels of a certain luminance or color (e.g., white for golf balls), look for shapes that match the shape of the objects to be tracked (e.g., a round or at least elliptical shape to find a round golf ball), and/or use template matching to search for the object (e.g., a golf ball) in the image.

Further, looking for locations that have one or more image data values that change by more than a threshold amount from one image frame to another image frame can include applying image differencing to find pixels or groups of pixels that change by more than the threshold amount. For example, image differencing can be applied to find pixels that change by more than a certain threshold value in each image, and groups of such changing pixels that are adjacent to each other can be found, e.g., using known connected-component labeling (CCL) and/or connected-component analysis (CCA) techniques. A group of such pixels (and potentially also a single pixel) that satisfy the object detection criteria is called a "blob", the location and size of each such blob can be stored in a list, and the list of all blobs in each image can be sent to the 2D tracking component. Turning an image into a list of object locations (or blobs) has a bandwidth reduction effect. In some cases, the bandwidth reduction of this operation may be 10:1 or more. But further bandwidth reduction can be achieved, as described in this document, which can provide a significant benefit when tiny objects are to be tracked.

In the case of tiny object tracking, there is a significant problem with false detections since it is difficult to discriminate tiny objects (possibly a single pixel in an image) based on features of the object. Thus, the identifying 315 (to detect objects of interest at specific locations in the camera images) can be implemented with a low threshold to favor zero false negatives, while allowing plenty of false positives. It is to be appreciated that this approach is generally counter intuitive in that false positives in object tracking is often disfavored, thus setting up a competition between minimizing both false positives and false negatives. But the present approach to object tracking readily accommodates false positives since the downstream processing is designed to handle large amounts of false positives. Nonetheless, because the object detection is designed to allow many false positives, more objects will be identified 315 in each image frame 300, including many "objects" that are just noise in the image data, thus partially offsetting the bandwidth reducing effect of turning an image into a list of objects.

Sequences of the locations identified in the image frames are found 320 (e.g., by a computer 125, 150, 160, 166). Note that the processes shown in FIG. 3 (and the other figures) are presented as sequential operations for ease of understanding, but in practice, the operations can be performed in parallel or concurrently, e.g., using hardware and/or operating system based multitasking, and/or using pipelining techniques. Pipelining can be used for concurrency, e.g., the object identification 315 can start processing frame n+1, if available, right after handing off frame n to the 2D tracking 320, without having to wait for downstream components to finish first. Thus, the disclosure presented in this document in connection with the figures is not limited to sequentially performing the operations, as depicted in the figures, except where the processes performed on respective computers are described as sequential processes, i.e., the object identification process, the 2D tracking process(es), and the virtual time synchronization and 3D tracking process(es) occur in sequence because each object identification and 2D tracking processing step reduces the bandwidth of data sent to downstream components.

Each of the sequences that are found 320 satisfies a motion criterion for locations identified in at least three image frames from the camera. In some implementations, the criterion is measured in relation to more than three frames and/or one or more criteria are used (e.g., the tree initiation criterion described below). In general, the 2D tracking tries to find sequences of objects (or blobs) over three or more frames that indicate object movement consistent with that of an object in Newtonian motion, unaffected by forces other than gravity, bouncing, wind, air resistance or friction.

The criterion for this object movement can be defined to include displacement, velocity, and/or acceleration in each dimension (x and y in the image) being inside a predefined range of values. This range of values is set so that the 2D motion and acceleration of an object in motion (e.g., a flying golf ball) as depicted by a 2D camera are well inside specified boundaries, whereas jerkier motion is rejected (absent a known object off which the object to be tracked can bounce). Moreover, because the larger system will employ a secondary tracking step in downstream processing, which can do more fine-grained filtering of what constitutes an actual object to be tracked, e.g., golf shots, the finding 320 need not be a perfect (or even close to perfect) filter that only accepts real object motion, such as that of a golf ball after being hit from a tee area 112.

Rather, the filtering done at 320 is intentionally made to be less than perfect, allowing objects other than objects in motion to be included in the found sequences, including potentially sequences of noise that are incorrectly identified 315 as an object of interest and then incorrectly found 320 to form a sequence. In other words, the finding 320 can implement a loose filter that increases false positives so as to minimize false negatives, e.g., all or close to all golf balls in motion will be accepted as forming a valid sequences at 320.

This looser (benefit of doubt) approach means that a much simpler tracking algorithm can be used at 320, knowing that it does not need to be perfect at discriminating desired objects (e.g., golf balls) from undesired objects (e.g., non-golf balls). The set of rules defining the tracking can be reduced to a minimum, and any mistakes made by the 2D tracking (as in letting a non-golf ball pass through) can be filtered out by the downstream components and processing. Instead of emitting entire trajectory paths, which each have one starting point and one ending point, the found 320 sequences can be represented by a "rooted tree" in which each vertex (node in the tree) is an observed blob (in x, y, and time t) and each edge is a possible movement between locations of an object whose motion is being tracked. Each such branch can also have some metadata such as the total depth of the tree, as is described in further detail in connection with FIG. 4A.

However, even with this looser (benefit of doubt/low threshold) approach, it is still possible that missed object detections will occur. Thus, dummy observations can be used to account for objects that should be in the image data but are not identified. In some implementations, if no sufficiently good blob is found that can extend a path, the 2D tracker can add a dummy observation at the predicted location. Dummy observations can be implemented with a significant penalty score and, in some implementations, dummy observations will not be allowed unless the graph is already at a certain depth. Since there are limits on how much penalty a branch can have, there are in practice limits on how many dummy observations a path may have.

Figure 4A:
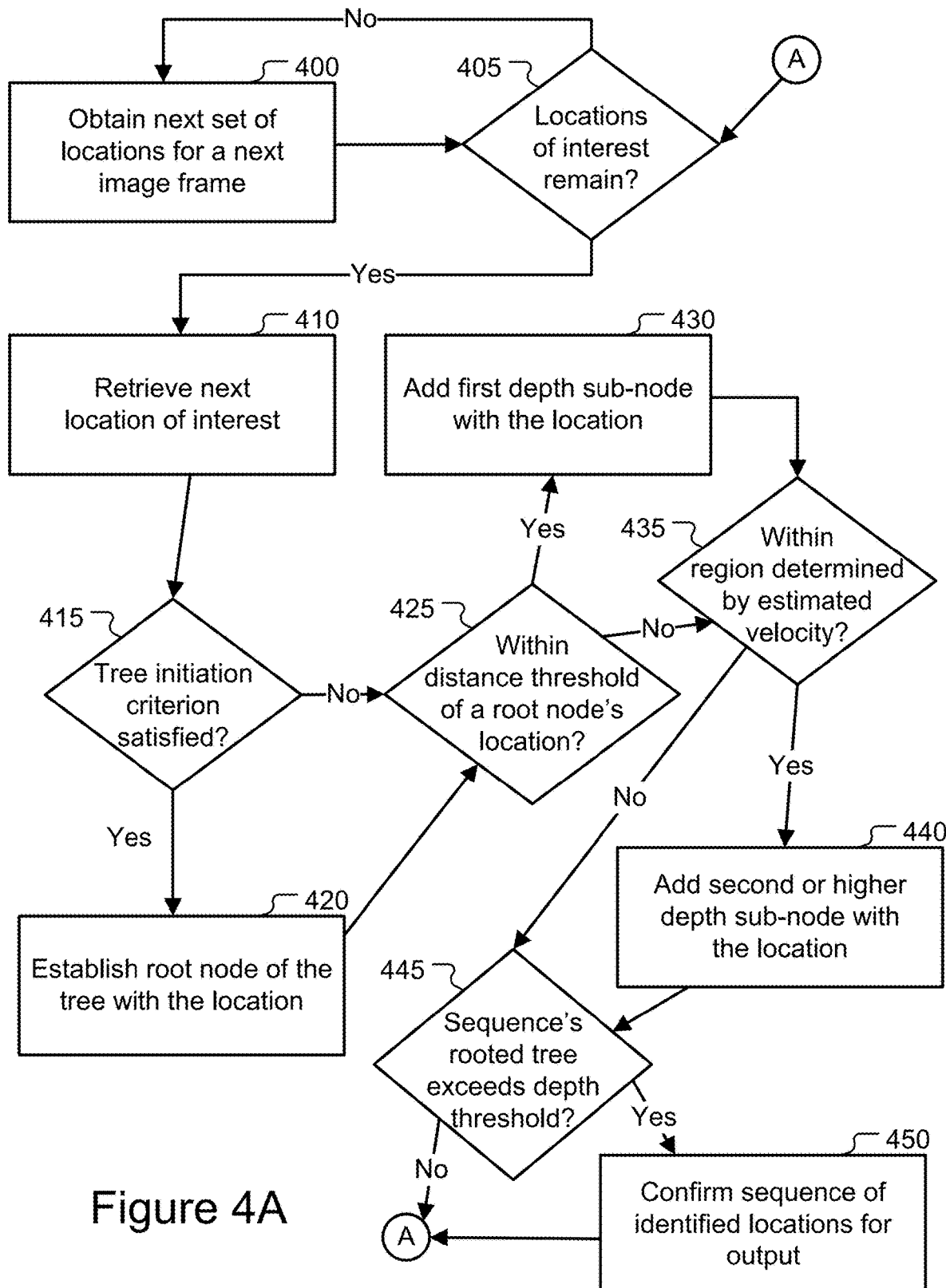
FIGS. 4A-4D show examples of a process that finds sequences of object locations that satisfy a motion criterion.

As noted above, the finding 320 can involve forming rooted trees from the locations of interest, where each rooted tree is a connected acyclic graph with a root node, which is the root of the tree, and every edge of the connected acyclic graph either directly or indirectly originates from the root. FIG. 4A shows an example of a process that finds sequences of object locations that satisfy a motion criterion by forming rooted trees. At 400, a next set of locations identified for an image frame is obtained for processing, and while locations of interest remain 405 in the set for the current frame, this processing continues. For example, when a frame of blobs is to be processed, all blobs in the new frame can be matched to all the tree nodes that were added during processing of the previous frame to see if the blob can be a possible continuation of that path, depending on how much the point in this branch looks like desired motion, as defined by the motion criterion.

Figure 4B:
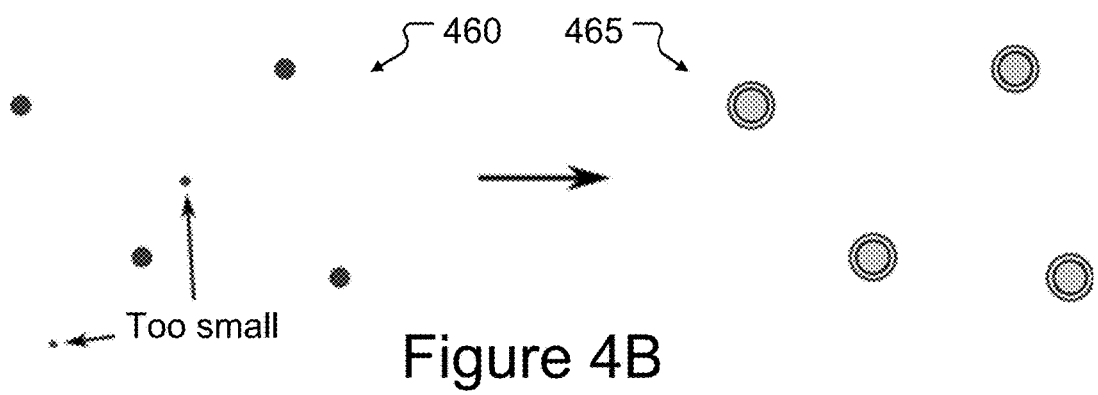

A next location of interest is retrieved 410 from the set, a check 415 is made to determine whether this location of interest satisfies a tree initiation criterion. If so, a root node of a new tree is established 420 using this location of interest. For example, if the image data values at the location of interest are larger than a minimum object size, then this can be used to indicate that a ball is close to the camera, and a new tree should be established. FIG. 4B shows a visual example of this, in which six blobs 460 are observed, but only four of these blobs 460 are large enough to be used to establish new root nodes 465. Note that one blob observation can be added to several trees, and every observed blob could in theory be the start of a new object observation. This can lead to a combinatorial explosion in noisy environments, and so in some implementations, some additional constraint (such as a minimum blob size constraint) is enforced before establishing a new tree.

In this example, all blobs that are larger than a certain minimum size are promoted to new trees of depth 0, where the minimum size limit can be set based on the camera resolution and the noise level of the incoming video. For example, the criterion can be that a blob must be at least 2 pixels (and not just a single pixel) to establish a new tree. Note that truly random noise affects the pixels individually and very rarely generates larger clusters in an image. Other approaches to avoiding a combinatorial explosion are also possible. For example, the noise thresholds in the blob generation (i.e., location identification) process can be adaptively adjusted.

Moreover, the minimum tree depth required for a path to be exported can be increased, which makes sure the amount of data exported is limited since random noise sequences rarely manage to build longer sequences just by chance. A lot of graphs with depth 0 and 1 will be generated, since the constraints are so generous, but most of these graphs will never reach depth 2 since the prediction is better then, and even fewer graphs will reach a depth of 3. Thus, statistics works to the benefit of the systems and techniques of this disclosure, as trees or branches get discarded when there are no more nodes that can be added to them.

In addition, in the case where the camera is located near the target, looking back toward the launch area of the object, i.e., when detecting incoming objects, different size thresholds can be applied in different parts of the image. For example, a minimum size of one pixel can be used in the portion (e.g., a rectangle) where a distant ball would be spotted, and a minimum size of two pixels can be used elsewhere. Thus, the criteria used to form the trees of possible object paths can be determined based on the location of the camera with respect to the launch area.

For example, if a somewhat flat ground plane can be presumed, and the camera location and aiming is known, all ball detections under the "horizon" of the ground plane can be "sanity" checked against an estimate of the maximum distance (and therefore minimum size) the ball can be at. A ray from the camera through the ball detection intersects the ground plane at some distance D. The ball must be at distance D or closer, or else it would be underground. For a random ball detection above the "horizon", there is no simple distance heuristic, since there is no ground plane intersection. However, if there is knowledge about the limits of the 3D space, e.g., the playing field, some general and/or angle dependent maximum distance/minimum object size constraint(s) can be used given that the object must be inside the 3D region of interest.

Figure 4C:
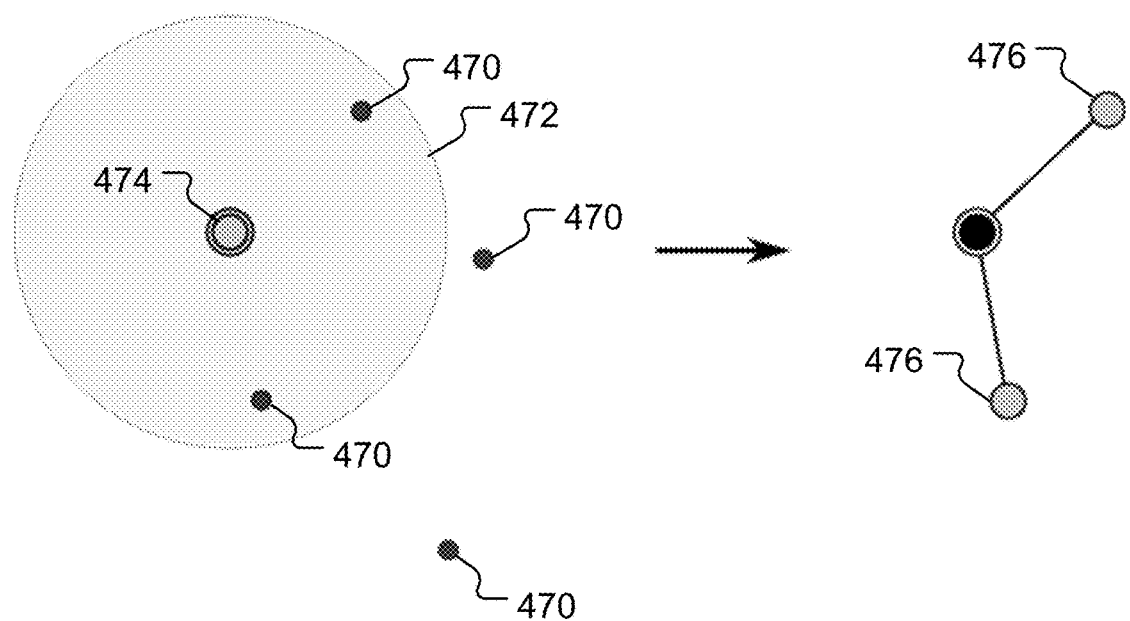

Returning to FIG. 4A, a check 425 is made to determine whether the current location of interest is within a distance threshold of an established root node for a location identified in a previous image frame. If so, the location of interest is added 430 as a first depth sub-node to this tree, under the tree's root node. Note that, if the tree is made up of only one vertex (depth=0), there is no way to estimate the velocity of that path yet, so it needs to be matched to any blob that is within a reasonable distance from the vertex. FIG. 4C shows a visual example of this, continued from FIG. 4B. Out of four observed blobs 470, only two blobs are within a distance limit 472 of a root node 474 from a previous frame. Thus, only two of the blobs 470 are added as first depth sub-nodes 476 to the rooted tree. In some implementations, the distance limit depends on the resolution and frame rate of the incoming sensor as well as the maximum expected velocity (perpendicular to the camera's aiming direction) of the object being tracked. If the size of the objects being tracked is known beforehand, as is the case with golf balls, this can be taken into account when determining the distance limit/threshold 472. Moreover, it can be presumed that a larger blob is closer to the camera than a smaller blob, which means that a larger movement between frames can be tolerated when there is a larger blob (either in the previous frame or the current frame, depending on the placement of the camera with respect to the expected direction of the objects being tracked).

Figure 4D:
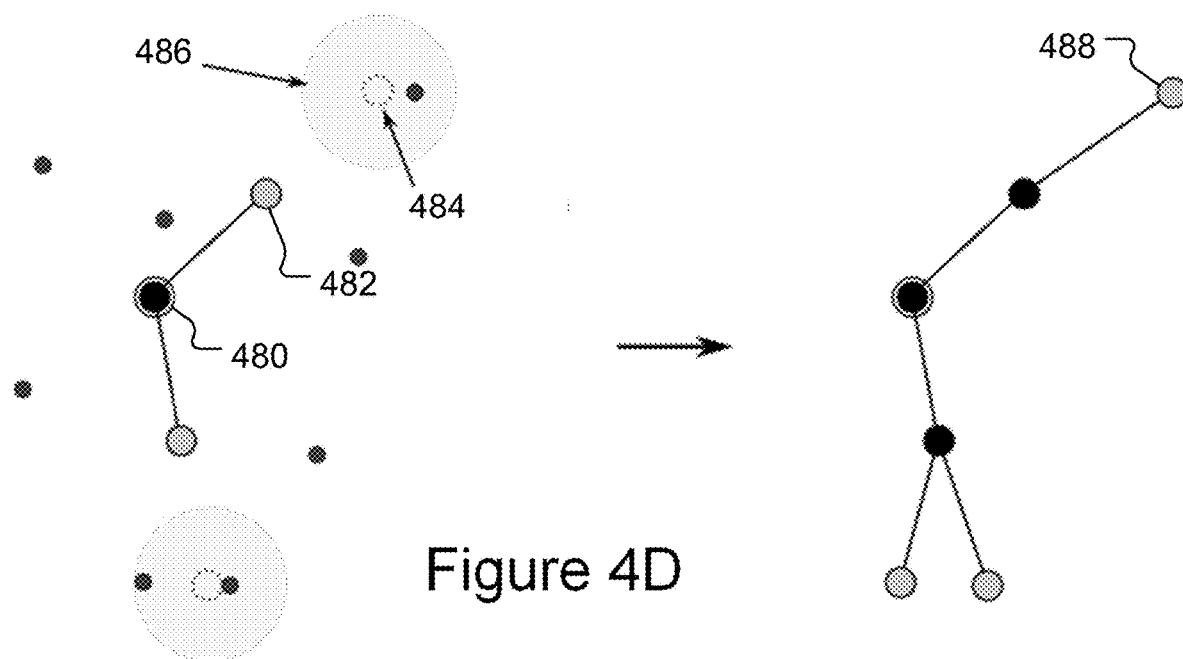

However, when matching the blobs to a vertex at depth one or more, it is possible to predict where the next point in a path should be. In some implementations, the expected region of the next blob is calculated by presuming that the velocity is the same since the last frame. FIG. 4D shows a visual example of this. Based on root node 480 location and a first depth sub-node 482 location, plus the known frame rate of the camera, a predicted location 484 is calculated. A search area 486 (or region) around the predicted location 484 is then determined for use in looking for blobs to add to the tree. Similar to the details provided above for determining the distance limit/threshold 472, the size of the area/region 486 around the predicted location 484 can be determined based on the resolution of the camera and the maximum expected velocity (perpendicular to the camera's aiming direction) of the object being tracked, potentially adjusted in accordance with the known size of the object and the size of the blobs in the different image frames. Moreover, in some implementations, a Kalman filter can be used in creating predictions, e.g., when the order of the graph is large enough.

Any blob that is sufficiently close to the predicted location can be turned into a vertex and added to the tree. Thus, as shown in FIG. 4D, one blob is within the region 486 of the predicted location 484, and so this blob is added as a new sub-node 488. In addition, in some implementations, penalties can be accumulated on the tree branches, where the penalties add up to a score that is used to rank the branches, which can help in deciding the best branches to export. Further, in some implementations, the more a blob's location deviates from the expected coordinates, a higher penalty can be given to this branch.

In some implementations, penalties accumulated on the tree branches and can be used to both limit how large of a penalty is allowed and to determine when to discard branches. In the former case, if a branch already has a high penalty, it will not be allowed to add new nodes that would make the extended branch exceed the limit. When the penalty is calculated from the discrepancy between the predicted location and the actual location, this is essentially a way of making sure that the acceleration is within limits. If it is not, the penalty will get too high. In the latter case, when there are several branches that have the last 3 blobs in common, the branch that is deepest and has the lowest penalty can be kept and the other ones can be discarded. Note that this type of penalty-based hypothesis tracking can be applied to 3D tracking (e.g., as described in further detail in connection with FIGS. 7-10B) in addition to 2D tracking.

Returning to FIG. 4A, a check 435 is made to determine whether the current location of interest is within a region determined using an estimated velocity of a location used for a parent sub-node of an established tree. If so, the location of interest is added 440 as a second or higher depth sub-node to this tree, under the parent sub-node, such as described above in connection with FIG. 4D. In addition, in some implementations, when the depth of the tree increases, more sophisticated prediction algorithms can be used to get better predictions. By fitting the most recent nodes in the branch to a second or third order polynomial function, both a good prediction of where the next point would be can be obtained and paths with clearly unreasonable changes in acceleration can be discarded. Moreover, in some implementations, the observations can be provided to a Kalman filter, and the Kalman filter's model can be used to produce new predictions.

In addition, it should be noted that the same location of interest in a single image frame can be added as respective sub-nodes (of first or higher depths) to two or more rooted trees that are keeping track of potential object paths through the image frames, as well as potentially being used to establish a new root node of a new tree. Moreover, the same location of interest in a single image frame can be added as a sub-node in a tree with more than one linkage back to respective parent nodes in the tree, including the same sub-node having different depths depending on which linkage is followed back to the root node.

Thus, many false paths will be produced, and even though the downstream processing can filter out these false paths, there should still be a limitation on when the potential paths will be output. In some implementations, no sequence will be considered for output until the rooted tree representing the sequence exceeds 445 a predetermined tree depth. Thus, a sequence of identified locations is not output until the sequence is confirmed 450 for output based the tree depth for the sequence exceeding 445 the predetermined tree depth, as specified for a given implementation, or as determined on the fly based on one or more factors.

Note that only the portions of the rooted tree that have the predetermined tree depth need be confirmed 450 for output as sequences of identified locations. This helps to prevent noise, which produces false paths in the rooted trees, from being propagated from the 2D tracking in the pre-processing stage at a first computer to the post-processing stage at a second computer. Also, the minimum tree depth threshold will generally depend on the environment and the acceptable delay for producing a 3D track of the object. In some implementations, the rooted tree of the sequence must have a tree depth greater than two before the sequence is confirmed 450 for output. In some implementations, the tree depth must be greater than three, four, five, six or seven, before the sequence is confirmed 450 for output.

For example, in some implementations, vertices of a tree (corresponding to the blobs/location) are only exported if they are at a certain depth (D) in the tree, or if they have child nodes that are exported due the child nodes having the certain depth (D) in the tree. A vertex with D=5 has five edges between itself and the root. This means that the output might be delayed by the same number D of frames, since it often cannot be known beforehand if a blob will be part of a sufficiently long branch. It can be shown that the described filtering (via limiting export of tree nodes) dramatically reduces the bandwidth required to communicate object candidates since the only blobs exported are the ones that constitute possible paths. The below table shows an example of reduction in bandwidth for a golf application based on required minimum branch depth.

TABLE 1

| Required Depth | Data Reduction |
| --- | --- |
| 1 | 73% |
| 2 | 84% |
| 3 | 93% |
| 4 | 97% |

TABLE 1-continued

| Required Depth | Data Reduction |
| --- | --- |
| 5 | 98% |
| 6 | 99% |

As this makes clear, the vast majority of all blobs/locations of interest are either not connected by any path or not connected by a path of sufficient depth, and thus most blobs/locations of interest are rejected by the effective filtering done in the pre-processing stage. Returning to FIG. 3, at 325, a check is made to determine if data for the sequences is ready for output, i.e., for any sequence of nodes in a tree that includes at least one node with a tree depth greater than the predetermined tree depth, as described above, the nodes of that sequence are ready for output. In such a case, output data for one or more sequences of locations is sent 330 (e.g., by a computer 125, 150, 166) to one or more second computers (e.g., a computer 140, 160). However, in some implementations, the identified 315 locations are sent from a first computer (e.g., by a computer 125, 150) to a second computer (e.g., computer 140, 160, 166) that finds 320 the sequences of the locations identified in the image frames and then outputs the sequences data to another process on the same computer or on a different computer. In any case, the sequence output data includes at least, for each location in each sequence, a two-dimensional position of the location in a specific image frame having a timestamp, which is needed for virtual synchronization at the second computer.

One of the fundamentals of 3D tracking is triangulation. However, triangulating the position of an object seen in two cameras requires that observations from the same time instance are at hand. A common way of achieving this is to use a common synchronous trigger signal for all cameras (e.g., transmitted through a cable). But this only works if the cameras have the same capture frame rate. In some setups, it is difficult or impossible to guarantee that the two cameras are in sync (triggering image captures in tandem), thus making triangulation of the observations from the different cameras difficult or impossible. To solve this problem, rather than attempting to actually synchronize the camera images with other sensor(s) at the point of data capture, timestamp information (in combination with information about the movement represented by the 2D path) is used for virtual synchronization at the second computer.

In addition, the systems and techniques described in this document are usable with both global shutter cameras and rolling shutter cameras. A rolling shutter means that the timing of the capture of each row in the camera image is different. So when an object is imaged by the sensor, the position of the object can be determined, but the time of the measurement depends on where in the image the object is found. In some implementations, there might be a time difference of approximately 20 milliseconds between the top and bottom image rows. This also produces a problem for triangulation, since the requirement of simultaneous measurement in both cameras may not be met. To solve this problem, the rolling shutter information is also taken into account by considering the relative time of the particular time offset of the 'location' within the frame, in addition to the timestamp of the frame, such that the measured object positions from rolling shutter cameras are also made usable for high quality triangulation at a second computer during the post-processing stage. For global shutter capture, this offset is always zero.

Since a number of frames of data may be required for a track to qualify for the minimum path length (minimum tree depth) requirement, such as described above in connection with Table 1, there is tradeoff between introducing a delay for all blobs, or implementing a more complex protocol that allows communicating already qualified blobs as soon as they are known. Thus, in some implementations, the sending 330 involves a delayed dispatch of both frame and blob data, and in some implementations, the sending 330 involves an incremental dispatch of the frame and blob data.

In the case of delayed dispatch, the sending 330 involves delaying outputting of data for a given image frame and its locations of interest found in one or more of the sequences, until no further locations of interest identified for the given image frame can be included in any of the sequences based on locations of interest identified in subsequent image frames. Thus, export of nodes for the frame can be done when the number of subsequent frames that have been processed excludes the predefined tree depth being reached for any more blobs in the current frame. In other words, the transmission of a frame is delayed until it is known that no further blobs identified in the frame will be included in a path in a rooted tree that has the required minimum tree depth.

Further, in some implementations, a dynamic minimum tree depth can be used. The minimum tree depth can be set low initially to minimize latency when there are few paths, and then dynamically increased if the load (total output of qualified paths per time unit) exceeds some maximum load threshold. This can provide a kind of throttling effect that improves performance by adjusting the processing in response to current input data.

In addition, the frame data structure can include a list of blobs that were detected in this frame and that passed the filter criteria. For example, the frame data structure can include the data fields shown in Table 2 below.

TABLE 2

| Name | Data Type | Description |
| --- | --- | --- |
| fn | int64 | Frame number according to video source |
| fn_prev | int64 | Frame number of previous frame. Will be fn + 1 unless there have been frames dropped upstream. |

TABLE 2-continued

| Name | Data Type | Description |
| --- | --- | --- |
| t_sync | int64 | Timestamp in microseconds. This timestamp is the one that should be used to correlate frames between cameras. |
| t_wall | int64 | Wall clock time expressed in microseconds elapsed since unix epoch |
| blobs | Blob[ ] | A list of blobs that was detected in this frame and that passed the filter criteria. |

Further, the Blob data structure included in the frame data structure can include the data fields shown in Table 3 below.

TABLE 3

| Name | Data Type | Description |
| --- | --- | --- |
| fn | int64 | Frame number where this blob was observed. |
| idx | int | Zero based index of blob in frame. First blob transmitted gets #0, next one #1 etc . . . |
| x | float | x coordinate of blob |
| y | float | y coordinate of blob |
| size | int | Number of pixels in blob |
| c | int8 | Blob contrast. Tells whether a blob is darker or brighter than the background model. |
| dt | int | Time offset (in microseconds) of blob within the frame, to handle rolling shutter effects. Actual time when the blob was observed is t_sync + dt. Should be 0 when using global shutter. |
| previous | int[ ] | Lists the indexes of all blobs in the previous frame that this blob is connected to. Empty if this is the root of the path tree. |

Note that these data structures can be encoded in various formats, such as in JSON format, as follows:

```
{"fn":25281,
"fn_prev":25280,
"t_sync":7430127868,
"t_wall":1587541719527486,
"blobs":[
    {"idx":0,"c":255,"dt":0,"prev":[0],"size":6,"x":939.5,"y":577.0},
    {"idx":1,"c":202,"dt":0,"prev":[1],"size":106,"x":973.625,"y":568.375},
    {"idx":2,"c":0,"dt":0,"prev":[2],"size":1,"x":681.0,"y":469.0},
    {"idx":3,"c":0,"dt":0,"prev":[4],"size":1,"x":2.5,"y":938.0},
    {"idx":4,"c":0,"dt":0,"prev":[5],"size":3,"x":0.875,"y":939.375},
    {"idx":5,"c":255,"dt":0,"prev":[6],"size":4,"x":959.75,"y":558.625},
    {"idx":6,"c":0,"dt":0,"prev":[6,7],"size":2,"x":949.5,"y":579.0},
    {"idx":7,"c":0,"dt":0,"prev":[8],"size":1,"x":678.75,"y":475.625},
    {"idx":8,"c":0,"dt":0,"prev":[8],"size":2,"x":677.625,"y":476.75},
    {"idx":9,"c":255,"dt":0,"prev":[9],"size":1,"x":433.0,"y":975.0},
    {"idx":10,"c":255,"dt":0,"prev":[10],"size":1,"x":410.5,"y":997.0},
    {"idx":11,"c":113,"dt":0,"prev":[11],"size":5,"x":411.75,"y":991.75},
    {"idx":12,"c":0,"dt":0,"prev":[12],"size":1,"x":407.5,"y":999.0},
    {"idx":13,"c":0,"dt":0,"prev":[13],"size":1,"x":410.5,"y":1012.0},
    {"idx":14,"c":0,"dt":0,"prev":[14],"size":1,"x":793.5,"y":599.0}
]}
```

For bandwidth constrained transmission, a more compact encoding can be used, such as Google's protocol buffers format.

When unfiltered blobs are passed between processing nodes, for instance if blob detection takes place in the edge device, while the pre-tracking and/or tracking is carried out on a different computer, a simplified format can be used, since there is no information anyways on the relationship between blobs of different frames. For example, the frame data structure can include the data fields shown in Table 4 below.

TABLE 4

| Name | Data Type | Description |
| --- | --- | --- |
| fn | int64 | Frame number according to video source |
| fn_prev | int64 | Frame number of previous frame. Will be fn + 1 unless there have been frames dropped upstream. |
| t_sync | int64 | Timestamp in microseconds. This timestamp is the one that should be used to correlate frames between cameras. |
| t_wall | int64 | Wall clock time expressed in microseconds elapsed since unix epoch |
| readout_duration | int32 | Number of microseconds between the start of the capture of the top raster line and the completion of the bottom raster line. For global-shutter sensors, this is zero. This can be negative if the readout was performed bottom-up rather than top-down. |
| n_rows | int16 | Number of rows (scan lines) in the frame. |
| n_columns | Int16 | Number of columns in the frame |
| blobs | SimpleBlob[ ] | A list of all blobs that was detected in this frame. |
| bitmap | byte[ ] | Contains a monochrome bitmap with n_rows × n_columns pixels. For each pixel, a 1 indicates that this pixel deviated from the noise model sufficiently to generate a blob, and a 0 means that the pixel was within the expected noise limits. Any standard image format that supports lossless storage of monochrome images can be used, for instance Portable Network Graphics (PNG) Specification (Second Edition). This can also be a raw bit-packed array, possibly compressed using a reasonably fast lossless compression algorithm such as DEFLATE Compressed Data Format Specification version 1.3. The sender and recipient must agree on which format that is used in each particular implementation. |

Further, the SimpleBlob data structure included in the frame data structure can include the data fields shown in Table 5 below.

TABLE 5

| Name | Data Type | Description |
| --- | --- | --- |
| x | float | x coordinate of blob |
| y | float | y coordinate of blob |
| size | int | Number of pixels in blob |
| c | int8 | Blob contrast. Tells whether a blob is darker or brighter than the background model. |

In the case of incremental frame dispatch, the sending 330 involves outputting data for the image frames as the identifying 315 is completed for each respective image frame, and outputting 330 data for each location of interest only after finding 325 one or more of the sequences include the location of interest to be output. As discussed above, the sequence needs to have the necessary tree depth in order for a node to be exported, and when a tree reaches the threshold depth, all parent nodes (of the tree node surpassing the threshold depth) that have not earlier been exported (by some other branch) are then output 330 retroactively. This is a more complex approach for sending the data that can be used if low latency is required. The 2D tracking outputs a continuous stream with information about the frames that have been processed and lists of all blobs that have passed the ball candidate filtering (i.e., all identified 315 locations of interest) as soon as the information is available.

For example, when a new frame is processed, the information for the frame can be sent using the frame data structure with the fields of data shown in Table 6 below.

TABLE 6

| Name | Data Type | Description |
| --- | --- | --- |
| fn | int64 | Frame number according to video source. |
| fn_prev | int64 | Frame number of previous frame. Will be fn + 1 unless there has been frames dropped upstream. |
| t_sync | int64 | Timestamp in microseconds. This timestamp is the one that should be used to correlate frames between cameras |
| t_wall | int64 | Wall clock time expressed in microseconds elapsed since unix epoch. |

Further, the blob data structure can include the fields of data shown in Table 7 below.

TABLE 7

| Name | Data Type | Description |
| --- | --- | --- |
| fn | int64 | Frame number where this blob was observed. |
| idx | int | Zero based index of blob in frame. First blob transmitted gets #0, next one #1 etc . . . |
| x | float | x coordinate of blob |
| y | float | y coordinate of blob |
| size | int | Number of pixels in blob |
| c | int8 | Blob contrast. Tells whether a blob is darker or brighter than the background model. |
| dt | int | Time offset (in microseconds) of blob within the frame, to handle rolling shutter effects. Actual time when the blob was observed is t_sync + dt. Should be 0 when using global shutter. |

Moreover, each connection between blobs can be represented using a connection data structure including the fields of data shown in Table 8 below.

TABLE 8

| Name | Data Type | Description |
| --- | --- | --- |
| In | int64 | Frame number of this blob. |
| idx | int | Index # in of the blob whose connections are listed. |
| prev | Array [int] | List of the indexes of all blobs in the previous frame that this blob is connected to in the paths fulfilling the criteria. |

The records generated using the above data structures can be put on the stream (from the first computer to the second computer) as soon as the information is established (the frames and blobs data can be sent 330 during and after the identifying 315, and the blob connections data can be sent 330 after a found 320 sequence formed by these blob connections has been confirmed 325 for output). It is guaranteed that every blob and frame that is referenced by a record will be put on the stream before the record that references it. However, in case the consumer starts reading mid-stream it might have missed the original declaration, so this issue should be addressed at the second computer.

Regardless of the data structures or output timing used, the output data 350 are received 360 (e.g., by a computer 140, 160) from the one or more first computers (e.g., from a computer 125, 150) via a second communications channel 355 coupling the first computer(s) with the second computer(s), where the second communications channel 355 through which the output data 350 is received has a second data bandwidth that is less than the first data bandwidth of the first communications channel 305. For example, the second communications channel 355 can be a copper Ethernet or wireless communications channel, e.g., communications channel(s) 162, 164. Further, in implementations where part of the pre-processing (e.g., the finding 320) is performed on the same second computer (e.g., by a computer 140, 160) as the additional processing operations 360-375, the received data includes the identified 315 locations and associated timestamp information.

In any case, the data continues to be received 360 until a check 365 shows a sequence is ready to be processed. In addition, as noted above, the operations can be performed in parallel or concurrently, e.g., using hardware and/or operating system based multitasking, and/or using pipelining techniques, e.g., during the constructing 375. Thus, the receiving 360 can continue while processing 370 of one or more sequences occurs in parallel or concurrently; each component can start processing frame n+1, if available, right after handing off frame n to the downstream component, without having to wait for downstream components to finish first, e.g., stereo triangulation can be performed for the next frame even if the 3D tracker hasn't finished processing the locations of interest.

The sequence(s) in the output data 350 are processed 370 by the one or more second computers (e.g., by a computer 140, 160) by interpolating between specified 2D positions in specific image frames for the sequence(s), using the timestamps of the specific image frames, to produce a virtual 2D position at a predetermined point in time. The record for each location of interest (e.g., each blob found in each frame) in the output data 350 includes both the timestamp of the frame and an indication of the previous one or more locations of interest connected to this location of interest by the 2D tracking component (e.g., each blob is described with pointers to the previous blob/blobs it belongs to). Thus, it is possible to determine from this data 350 the time, location and direction of travel and speed of each location of interest/blob.

The data 350 thus enables the use of interpolation to produce virtual "intermediary" locations/blobs at any given point in time on a path, as long as there exists at least one location of interest/blob in the tree with an earlier timestamp, and at least one location of interest/blob with a later timestamp. In addition, in some implementations, the predetermined point in time is one of multiple time points of a predefined constant frame rate of a 3D tracking server. For example, a 3D tracking server computer 140, 160 can run on a predefined constant frame rate and use interpolation to generate virtual snapshots of all the cameras' blobs at these points in time. Since the blob coordinates now all represent the same point in time, triangulation between the points is possible even though the original capture was not synchronous. Moreover, in some implementations, the predetermined point in time is a time specified by another sensor, such as another camera sensor or a radar sensor.

Figure 5:
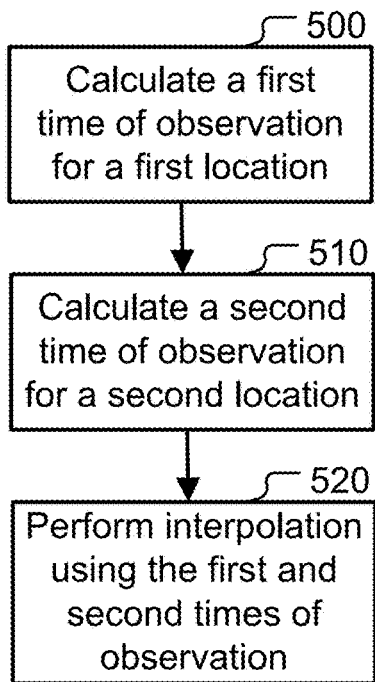
FIG. 5 shows an example of a process that interpolates between specified 2D positions in specific image frames obtained from a rolling shutter camera.

Furthermore, as noted above, the camera can be a rolling shutter camera, in which case, the output data 350 can include a time offset value for each location of interest included in each sequence. With this data in hand, the processing 370 also works for virtual time synchronization with a rolling shutter camera. FIG. 5 shows an example of a process that interpolates between specified 2D positions in specific image frames obtained from a rolling shutter camera.

A first time of observation for a first location having one of the specified 2D positions in the specific image frames is calculated 500 by adding a first time offset value for the first location to the timestamp of a first of the specific image frames. For example, the time offset (dt) of a first blob within a first frame (as detailed above in Tables 3 and 7) can be added to the timestamp (t_sync) of that first frame (as detailed above in Tables 2, 3, 6, and 7). A second time of observation for a second location having another one of the specified 2D positions in the specific image frames is calculated 510 by adding a second time offset value for the second location to the timestamp of a second of the specific image frames. For example, the time offset (dt) of a second blob within a second frame (as detailed above in Tables 3 and 7) can be added to the timestamp (t_sync) of that second frame (as detailed above in Tables 2, 3, 6, and 7). Then, the interpolating is performed 520 using the first time of observation and the second time of observation, calculated from the time offsets and the frame timestamps.

Returning to FIG. 3, with the virtual 2D position produced, a 3D track of the object (e.g., a ball) in motion in 3D space is constructed 375 (e.g., by a computer 140, 160) using the virtual 2D position that was produced, and position information obtained from at least one other sensor for the predetermined point in time. The constructing 375 can be for display (e.g., immediate display) of the 3D track of the object, or the constructing 375 can produce the 3D track for use as input to further processing before display. For example, the 3D track can be further processed to be effectively displayed by overlaying a trace of a golf ball in a TV signal produced for live transmission, or for recording. As another example, the 3D track can be further processed to be effectively displayed by augmenting other data or media, such as by showing the path of a golf ball in a computer representation of a physical environment in which a golfer is located, or in a virtual environment that exists only in the computer but is displayed to a user of the system.

Other types of further processing before display are also possible. For example, the 3D track can be further processed to determine the final resting positing of the sporting ball, which can be useful for betting applications or general stats collection that feeds sport websites. In addition to showing the trace, the 3D track can be further processed to measure the velocity, spin, carry and launch angle of the shot. The 3D track can be further processed to determine whether balls went over the netting at a site and into the neighboring premises. The 3D track can be further processed to tell the range owner which bays have ongoing activity and also to count the number of balls that were shot from each bay.

Figure 6B:
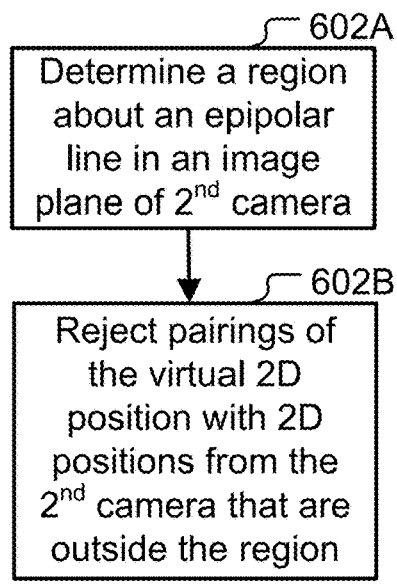
FIG. 6B shows an example of a process that excludes at least one 2D position obtained from a second camera.
Figure 6A:
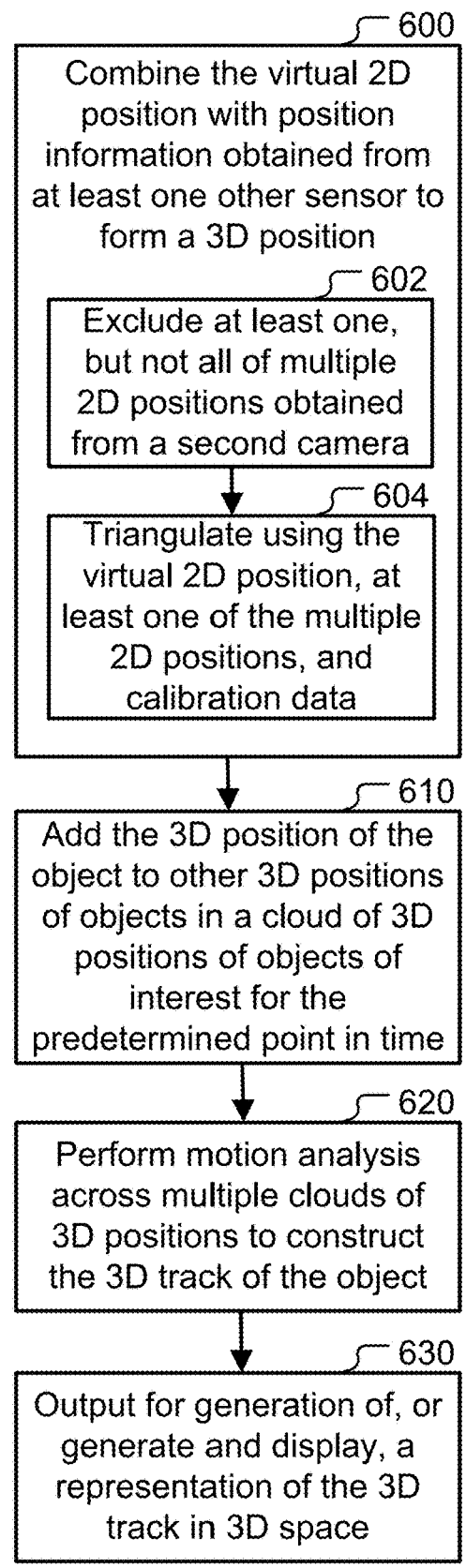
FIG. 6A shows an example of a process that constructs a 3D track of an object (e.g., a ball) in motion.

FIG. 6A shows an example of a process that constructs a 3D track of an object (e.g., a ball) in motion. The 3D track construction includes combining 600 (e.g., by a computer 140, 160) the virtual 2D position with the position information obtained from the at least one other sensor to form a 3D position of an object of interest. In general, this involves triangulation of the observations from the different sensors, using the object observation data produced using those different sensors, and using calibration data for those different sensors. Note that the produced observation data is usable in the triangulation because of the virtual time synchronization achieved by producing the virtual 2D position.

For example, the other sensor can be a second camera, which is to be used as a stereo pair with the first camera for which the virtual 2D position was produced. The object detection, 2D tracking and virtual time synchronization techniques described above can also be used with the second camera. In light of this, the output data for the second camera can produce multiple detected objects (with multiple corresponding virtual 2D positions) at the same, shared point in time for which the virtual 2D position was produced for the first camera. Thus, the position information for the second camera can be two or more 2D positions obtained from the second camera, and the combining 600 can include determining which of the two or more 2D positions from the second camera should be matched up with the virtual 2D position produced for the data from the first camera.

Further, the combining 600 can involve excluding 602 at least one, but not all of the two or more 2D positions obtained from the second camera as not able to form a 3D point with the virtual 2D position obtained from the first camera. FIG. 6B shows an example of a process that excludes at least one 2D position obtained from a second camera to effect epipolar line filtering before triangulation 604. A region about at least a portion of an epipolar line in an image plane of the second camera is determined 602A using the virtual 2D position produced for the first camera, an optical center of the first camera, an optical center of the second camera, a baseline between the first and second cameras, and extrinsic calibration data for the first and second cameras. In some implementations, the region is determined 602A based on a margin of error for the data being used.

In some implementations, the baseline between the first and second cameras 120, 130 of a stereo camera pair is thirty meters or less, which provides a reasonable stereo precision in combination with the ability to detect the shot early enough to be able to extrapolate the trajectory back to the location it was hit from. Using a lens with a wider field-of-view allows the shot to be observed earlier, but at the expense of less precision when the ball is far away. Higher resolution cameras can mitigate this to some extent. A shorter baseline provides less depth precision but allows the shots to be observed earlier. Note that using the virtual time synchronization described in this disclosure, the data from different pairs of cameras 120, 130 can be combined as needed, e.g., dynamically in real time. Thus, different pairs of cameras 120, 130 in the system can form a stereo pair, and the different stereo camera pairs can thus have different baselines and different depth precision.

Further, in some implementations, the determined 602A region is reduced (or further reduced) 602A based on portions of the epipolar line that cannot be used due to known limits on the distance to the object, e.g., the known distance between the camera and the tee area 112 and/or target 114. Moreover, other criteria can be used when matching up observations of ball candidates from different cameras used as one or more stereo pairs. For example, an additional criterion can be that the blob contrast for the respective blobs observed by two cameras (used as a stereo pair) are similar.

Then, pairings of the virtual 2D position obtained from the first camera with respective ones of the two or more 2D positions obtained from the second camera are rejected 602B in response the respective ones of the two or more 2D positions being outside the region about the at least a portion of the epipolar line in the image plane of the second camera. In essence, the line in 3D space that is seen by the first camera as a single point in the 2D plane of the first camera (because this line is directly in line with the first camera's optical center) is seen by the second camera as a line in the image plane of the second camera, which is known as the epipolar line. Given a known 2D position of an object observed by the first camera, only objects observed by the second camera that fall along this epipolar line (within some tolerance value) can be the same object observed by both cameras. Moreover, if the system is designed and setup with known limits on what distances to objects should be considered (e.g., distances based on the distance to the tee area 112, the distance to the target 114, such as distance to a green when tracking balls coming onto the green, and/or distance(s) to objects that are currently being tracked) the system can place hard stops (boundaries) on the epipolar line for use in the rejecting 602B. Thus, objects that are clearly out of bounds (e.g., airplanes, birds, lights from distant traffic, etc.) can be readily ignored by the system.

Other approaches to excluding 2D positions obtained from the second camera are also possible. For example, as noted above, the output data can include, for each location after an initial location in each sequence, an indication of a previous location in the sequence. Because this data is included (e.g., because the sending 330 transmits not only the position of each blob but also the position of earlier observed blobs that have been connected by the 2D tracking in a path sequence) the possible 2D motion direction and velocity of each object of interest (blob) can be estimated, and this estimation can be used to do motion filtering before triangulation 604, e.g., the stereo triangulation algorithm can use this information to reject blob pairings with incompatible parameters, such as by using the velocity vectors of the left and right stereo points to rule out false positives. For example, when the location of where the object will be in the next frame is predicted (based on the current velocity) in both cameras, the predicted locations (when triangulated) will also end up close to the next actual observation when the blobs are indeed observations of the same object from two different angles.

Thus, the excluding 602 can involve: estimating a 2D velocity for an object at the virtual 2D position based on the specified 2D positions in the specific image frames, where at least one of the specified 2D positions is identified in the output data using an indication of a previous location in the at least one of the sequences; estimating 2D velocities for objects at the two or more 2D positions obtained from the second camera; and rejecting pairings of the virtual 2D position obtained from the first camera with respective ones of the two or more 2D positions obtained from the second camera based on the 2D velocities estimated for the object at the virtual 2D position and for the objects at the two or more 2D positions, and the intrinsic calibration data and the extrinsic calibration.

Note that the coordinates of the location/blob need to be both undistorted using the intrinsic calibration data and also converted to compatible coordinate systems using the extrinsic calibration data, as will be appreciated by those skilled in the field. An intrinsic calibration can be performed that finds the optical distortion and true focal length of each camera. An extrinsic calibration can be performed that finds the direction of the cameras in relation to each other. Together, the intrinsic and extrinsic calibrations are referred to as "the calibration", or "the calibration data", and can be used for triangulating the position of objects that are seen by both cameras.

In addition, the other sensor can include a radar device rather than a second camera. For example, one or more radar devices can be combined with a single camera, with a stereo camera pair, or with three or more cameras, to form one or more hybrid camera-radar sensors, in accordance with the systems and techniques described in U.S. Pat. No. 10,596,416, to provide at least a portion of the sensors of an object detection system that register objects of interest for 3D object tracking. Readings from the radar(s) that may be detections of a moving object (e.g. a golf ball) can be added to a 3D point cloud of three-dimensional positions of the objects of interest and thus add to the potential robustness and coverage area of the combined sensors.

The readings from the radar can be turned into 3D points using the following approach. A distance measurement from the radar can be combined with all ball candidates detected by one of the cameras at the same point in time; note that this can include combining the radar with ball candidates detected by only one camera in a stereo camera pair and/or with respective ball candidates detected by both cameras in a stereo camera pair, i.e., a single stereo camera and a single radar device can operate as three distinct sensors (a stereo camera sensor, a radar+left-camera sensor, and a radar+ right-camera sensor) able to produce 3D points for ball candidates. The angle to each ball candidate, as reported by the camera, and the distance reported by the radar will determine a 3D location in space. This can be done for each ball candidate seen by the camera, which will produce an array of 3D points to add to the point cloud. At most one of those points will be a correct association of radar data and a ball observation (meaning they both stem from the same object; a true positive). The rest of the 3D points will be false associations (false positives). However, the 3D point tracking algorithm is chosen to be robust against a majority of 3D points being false positives. Moreover, in some implementations, one or more radar sensors that are capable of determining both range and angle to each observed object can be used in the system.

But regardless of whether or how position data from a second sensor is obtained and/or excluded, in some implementations, a 3D position of the object of interest can be triangulated 604 using the virtual 2D position obtained from the first camera, at least one of the two or more 2D positions obtained from the second camera, intrinsic calibration data for the first camera and the second camera (the determined optical distortion and true focal length of each camera), and extrinsic calibration data for the first and second cameras (the determined direction of the cameras in relation to each other). Note that since the coordinates of the locations/blobs all represent the same point in time, triangulation 604 between the points is possible even though the original capture was not synchronous.

Then, the 3D position of the object of interest can be added 610 to other 3D positions of objects of interest in a cloud of 3D positions of objects of interest for the predetermined point in time. Note that various types of data structures can be used. In some implementations, the clouds of 3D positions are stored as octrees, and this type of data structure allows any point in 3D space to be represented (to the precision limit of the computer representation of scalar numbers). Motion analysis across multiple clouds of 3D positions is performed 620 to construct the 3D track of the ball in motion in 3D space, where each of the multiple clouds is for a single point in time. This motion analysis can be done during hypothesis formation, hypothesis extension, hypothesis branching, and/or as a final "golf ball" classification that checks whether or not the trajectory hypothesis corresponds sufficiently to expected motion of a golf ball in flight in 3D space.

Note that various types of motion analysis can be used. Nonetheless, it should be appreciated that, even though the number of false positives included in the data 350 may be larger than that of a traditional object tracking technique, these false positives tend to be spread out in the 3D space, which is large in comparison to the 2D image plane of the camera from which the false positives originate. Because of this, once the 3D tracking system identifies an object in 3D motion, it is straight forward for the 3D tracking system to readily discard any false positives in the 3D space that do not match up with the ongoing 3D track being constructed.

Thus, the 3D tracking is robust enough to handle the false positives injected into the 3D clouds because: (1) the false positives are mostly randomly spread out through the 3D space, which makes it unlikely that the false positives create a coherent trajectory (according to the motion analysis); (2) if a false positive is close to the hypothesis of a real object in flight and added to the hypothesis of that object, the 3D tracking can branch (split) the hypothesis when it receives one or more later, true observations of that object in flight that disagree with the false positive, and since the branch containing the true observations are much more likely to continue than the branch containing the false positive, this will lead to the branch containing the false positive being discarded in most (if not all) cases; and (3) in some implementations, the tracked positions are smoothed (e.g., after 3D tracking and/or using a Kalman filter or a low-pass filter) to increase accuracy with respect to the real object in motion, but this also has the effect that the false positives added during hypothesis formation are effectively removed as they differ compared to the real observations in random amounts, which thus tend to cancel out during the smoothing. Additionally, it should be noted that a hypothesis containing false positives but that nonetheless has a coherent motion (typically the trajectory of an object other than a golf ball) can still be rejected by the "golf ball" classification (either before or after any smoothing) that checks whether or not the hypothesis corresponds sufficiently to expected motion of a golf ball in flight in 3D space.

In addition, the process can include outputting 630 the 3D track for generation of a representation of the 3D track, or generating and displaying 630 the representation of the 3D track in 3D space. As noted above, this can involve further processing of the 3D track to effectively display it by overlaying a trace of a golf ball in a TV signal produced for live transmission, or for recording, or this can involve further processing of the 3D track to effectively display it by augmenting other data or media, such as by showing the path of a golf ball in a computer representation of a physical environment in which a golfer is located, or in a virtual environment that exists only in the computer but is displayed to a user of the system, e.g., a virtual environment that is shared between participants in a multi-player game (either locally on the same range or scattered across the globe).

Figure 7:
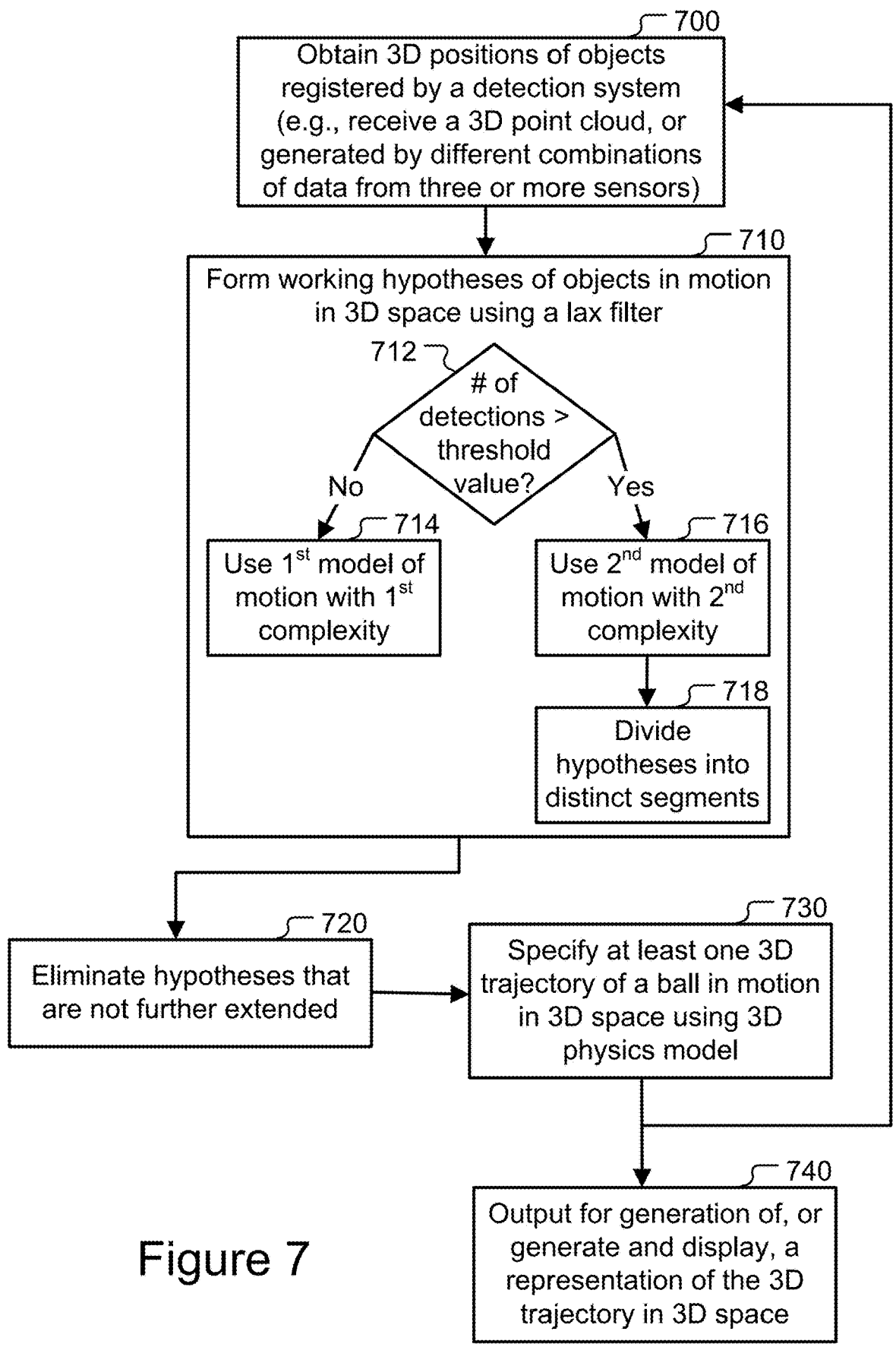
FIG. 7 shows an example of a process of 3D object tracking of objects in motion using unverified detections registered by two or more sensors.

FIG. 7 shows an example of a process of 3D object tracking of objects in motion using unverified detections registered by two or more sensors. Three-dimensional (3D) positions of objects of interest registered by an object detection system are obtained 700. In some implementations, the obtaining 700 involves generating the 3D positions of objects of interest using the object detection systems and techniques described above in connection with FIGS. 3-6B. In some implementations, the obtaining 700 involves one or more other approaches to generating the 3D positions of objects of interest. In some implementations, the obtaining 700 involves receiving the 3D positions of registered objects of interest from the above described object detection systems and techniques and/or other object detection systems and techniques.

In any case, the object detection system is configured to defer strict classifications of detections into "true positives" and "false positives" until a later stage in the tracking algorithm, and thus at this stage allow a significant amount of false positives for the registered objects of interest so as to minimize false negatives. The false positives can include both false detections by individual sensors (e.g., detections from a single sensor if it is by itself capable of determining the 3D position of the detection, such as a phased array radar with both angle and distance measurement capabilities) and false combinations of detections from respective sensors, which can include two or more cameras, a camera and a radar device, or a stereo camera and a radar device. In some implementations, a majority of the registered objects of interest are false positives. In some implementations, the false positives majority can be 60% or more, 70% or more, 80% or more, 90% or more, 95% or more, or 99% or more of the registered objects of interest (generated by the object detection system) being false positives.

Moreover, multiple sensors 130 can be used in a manner that improves the system's robustness for detecting balls in motion without overloading the 3D tracking algorithm. In some implementations, the obtaining 700 involves generating the 3D positions of registered objects of interest by making different combinations of data from three or more sensors 130. The three or more sensors 130 can include three cameras 130, and making respective combinations of the detections from respective pairs of the three or more sensors for a current time slice can include combining detections of a single object of interest by the three cameras using two or three stereo pairings of the three cameras to generate two or three respective three-dimensional positions of the single object of interest. Thus, a stereo pair can be formed with any combination of two cameras out of the three cameras, if one of the three cameras fails to detect the object in a particular time slice, the 3D tracking will still have a sensed 3D position to work with, and when all three cameras detect the object in a particular time slice, three separate 3D positions can be added to the 3D point cloud for the object in that time slice, where one of these three is likely to be better than the other two. Thus, this adds redundancy to the data acquisition and can improve the 3D tracking.

In addition, the three or more sensors 130 can include two cameras 130 and a radar device 130, and making respective combinations of the detections from respective pairs of the three or more sensors for a current time slice can include combining detections of a single object of interest by the two cameras using a stereo pairing of the two cameras to generate a first three-dimensional position of the single object of interest, and combining detections of the single object of interest by the radar device and one of the two cameras to generate a second three-dimensional position of the single object of interest. Similar to the three camera case, this also add redundancy and can improve the 3D tracking. In some implementation, the data from the radar device is combined separately with data from the two respective cameras to product three separate 3D positions in 3D space. In some implementations, more sensors (e.g., cameras and radar devices) can be added to the system to further increase redundancy without overloading the 3D tracking. Moreover, the 3D tracking can be improved by this added redundancy in that the noise in the input 3D positions data can be at least partially cancelled out by the system's ability to choose the best available observation to extend each hypothesis.

In any case, as the 3D positions of objects of interest are obtained 700 (e.g., in real time, in batches, etc.) working hypotheses are formed 710 from the 3D positions, where each hypothesis represents an object in motion in 3D space. The forming 710 of hypotheses of objects in motion in 3D space uses a lax filter applied to the 3D positions of the registered objects of interest. The lax filter allows connections between specific ones of the registered objects of interest when estimated 3D velocity vectors for the specific objects of interest roughly correspond to an object in motion in three-dimensional space across time. Note that each velocity vector is an estimate of a direction in 3D space and a speed (in that direction) for the object of interest, which may or may not be a ball, as the object is unverified at the time of hypothesis formation 710. In addition, the hypotheses can include at least some hypotheses that each branch into more than one hypothesis of an object in motion in 3D space, such as described in further detail below.

The "roughness" here is similar to that described above for 2D tracking, in that the 3D tracker tries to find sequences of objects of interest in 3D space that indicate object movement consistent with that of an object in Newtonian motion, without initially considering other forces such as wind, air resistance or friction, and in some cases even ignoring gravity, i.e., without assessing if the acceleration of the object is fully compatible with the physics of a golf ball in flight at this stage. Thus, the verification that the apparent forces acting on the object are consistent with a golf ball in flight, is deferred until a later stage of the 3D tracking.

In addition, in some implementations, the 3D tracking component has more than just 3D point clouds to work with. For example, as noted above, pre-tracking in 2D can be done on data from one or more camera sensors 130, e.g., a golf ball can be independently tracked in 2D data from each camera as long as possible to produce several 2D tracks of the ball, and so the data provided to the 3D tracking process can include partial segments of an object trajectory in addition to single detections of an object. When trying to match detections between different sensors, partial trajectories (formed by pre-tracking) can be matched against each other (regardless of whether or not the partial trajectories overlap completely), and the 3D tracking process can compare and connect partial segments of a trajectory in 3D instead of (or in addition to) points in 3D as part of the forming 710 of hypotheses of objects in motion in 3D space. Note that this approach can reduce the number of false ball detections, which allows a simplification of one or more aspects of the 3D tracking, but also requires a more complex image tracking process, which may not be preferred in some cases.

In some implementations, the forming 710 involves checking 712 whether a number of object detections for a given hypothesis is greater than a threshold value. When the number of registered detections for the given hypothesis is less than or equal to the threshold value (or simply less than, which can be equivalent depending on the threshold value used), a first model of motion in 3D space is used 714, where the first model has a first level of complexity. And when the number of registered detections for the given hypothesis is greater than the threshold value (or greater than or equal to, which can be equivalent depending on the threshold value used), a second model of motion in 3D space is used 716, where the second model has a second level of complexity that is greater than the first level of complexity of the first model.

The first model creates a first stage of processing that uses a very loose filter for what constitutes an object in Newtonian motion. This allows very rapid, but also extensive hypothesis formation, as random false positives can readily form hypotheses initially in this first stage. But because of this (in combination with the number of false positives allowed into the hypothesis formation pipeline) it will be almost impossible to miss any real object in the 3D space that exhibits the desired motion. The second model is more complex than the first model in that some knowledge of 3D physics (but not necessarily a full 3D physics model) is used in a second stage to prevent continuing formation of false hypotheses.

Note that this approach is the opposite of traditional 3D tracking where one would use very tight filtering at the beginning of the tracking pipeline to avoid burdening, e.g., overloading, the processing capabilities of the system farther down the tracking pipeline with false positives. In contrast to this traditional approach, the present systems and techniques delay/defer filtering as much as possible to later stage(s) of the tracking pipeline when more information about the motion of the object will be available for use in filtering out hypotheses that should not have been formed in the first place, e.g., combining information about the movement and position in 3D space with other information, such as whether object size information matches the triangulated distance from the sensor(s). In other words, more advanced filtering techniques can be used efficiently, while minimizing the risk of missing actual objects in flight, if the filtering can be deferred to later portion(s) of the tracking pipeline, as described in this document.

This approach can also have particular value when used with sensor(s) placed near the expected target of the object in flight since the object will be slowing and also increasing in relative size in the field of view of such sensor(s) as time proceeds. As described, the system can employ both camera and radar sensors, including potentially a stereo camera that is a single sensor in the system or a combination of data from two separate (and selectable) cameras in the system. In the case of a golf shot, when one or more sensors are placed at the target (e.g., the green on a golf course) then the data from a radar sensor will be most useful in tracking the ball on its flight from the hitting location toward the target, but the data from a camera sensor will be less useful in detecting this initial portion of the ball trajectory when the ball is far from the sensor, depending on the choice of lens and baseline used to track with stereo vision. Thus, absent combining two cameras into a stereo vision system with a wide baseline, the radar can provide better tracking data for the flight segment and the stereo camera system can provide better tracking data for the bounce and roll segments.

Likewise, when one or more sensors are placed at the hitting location (e.g., the tee) then the data from both a radar and a stereo camera system will be useful in tracking the ball from launch, even with a short baseline for the stereo system, but the accuracy of the stereo vision system will degrade faster than the radar system. If the baseline is small enough, the stereo vision system will likely lose the 3D track of the ball when the 3D accuracy is so low that the ball cannot be detected in 3D space. But if the baseline is large enough, this can be avoided, and the radar data may not be needed for 3D object tracking.

Note that some system deployments can use sensors at the target (e.g., the green) at the hitting location (e.g., the tee) and at one or more locations there between (e.g., along the fairway), and the types of sensors (e.g., radar versus camera) and sensor configurations (e.g., the baseline of the stereo vision system of two cameras) selected for use in the specific locations can be determined in accordance with the likely nature of the golf shot in the vicinity of each respective sensor. In cases where the bounce and roll segments of the ball's path in 3D space are likely to be far from a sensor, additional cameras can be used with different optics (more zoomed in, longer focal length, etc.) in order to see the bounce and roll better.

Thus, the specific set of sensor types, configurations and placements used can be tailored to a specific deployment of the system, such as a combination of a hybrid camera-radar sensor unit near the tee (to provide high quality tracking data for the flight segment) with a stereo camera unit near the target (to provide high quality tracking data for the bounce and roll segments) such as two or more cameras with at least four feet separation between each pair of cameras, e.g., two cameras mounted on a horizontal beam on a single tripod, each camera having wide-angle optics that give a field of view of more than 90 degrees, allowing coverage of an entire golf green, even in conditions where space is scarce. With a four foot baseline, the measurement error can be +/-3 inches for typical golf greens. Moreover, improved accuracy can be achieved by adding one or more layers of computer vision when the ball has come to a full stop. This triangulates the resting position based on the centers of the ball as observed in both cameras, which increases the accuracy.

Further, in some implementations, the first model of motion in 3D space is a linear model that connects a first 3D position of a registered object of interest to the given hypothesis when the first three-dimensional position extends the given hypothesis in roughly a same direction predicted by the given hypothesis. For example, the first model can be a simple dot product check on the vectors defined by three 3D points, P1, P2, P3 representing registered objects of interest (with potentially one both of P1 and P2 being a 3D position predicted by an active hypothesis). If the dot product of $vector_{i \to (i+1)}$ (P2→P3) with $vector_{(i-1) \to i}$ (P1→P2) (or potentially the dot product of $vector_{(i-1) \to i}$ (P1→P2) with $vector_{(i-1) \to (i+1)}$ (P1→P3)) is positive, i.e., the angle between the prior velocity vector and the new velocity vector is less than 90 degrees, then this can be considered close enough to Newtonian motion in 3D space to connect the specific 3D points, P1, P2, P3 in a formed hypothesis. Also, in some implementations, the threshold angle between the prior velocity vector and the new velocity vector is a programmable parameter that can be adjusted experimentally for a given implementation after deployment.

Other types of first models are also possible, but each such first model should be very simple, as this facilitates rapid initial hypothesis formation and minimizes the risk that a new object in flight in the 3D space will not be detected. Note that the system can be designed such that any hypothesis formed using only the first model will never be sent as output, thus requiring some extension of the hypothesis with the second model before the hypothesis can be output for verification of the object in flight. Moreover, the forming 710 of hypotheses can include dividing 718 the hypotheses into distinct segments, and in some implementations, the dividing 718 is only performed for hypotheses that have been extended at least once using the second model of motion in 3D space.

In some implementations, the second model of motion in 3D space is a recurrent neural network (RNN) model that has been trained to make short term predictions of motion in three-dimensional space. In some implementations, the second model of motion in 3D space is a numeric physics model that employs numerical integration combined with numerical optimization. Other types of second models are also possible, such as another machine learning model that maps observations to future positions directly, or a set of differential equations (which are more complex than a linear model) for describing how a ball will fly in the future given the current observations, where these differential equations can be solved analytically (an analytical physics model) or using numerical methods, potentially also employing one or more Kalman filters to remove noise in the data (seen as a low-pass filtering) in support of numerical optimization. Different models have different trade-offs in terms of performance, accuracy and noise sensitivity. Thus, the specific type of second model used can depend in part on the specific deployment of the system, e.g., depending on the nature of the sensor(s) 130 used in the system, and whether those sensor(s) 130 are located on one side, two sides, three sides, or all sides of the 3D space 110.

Figure 8:
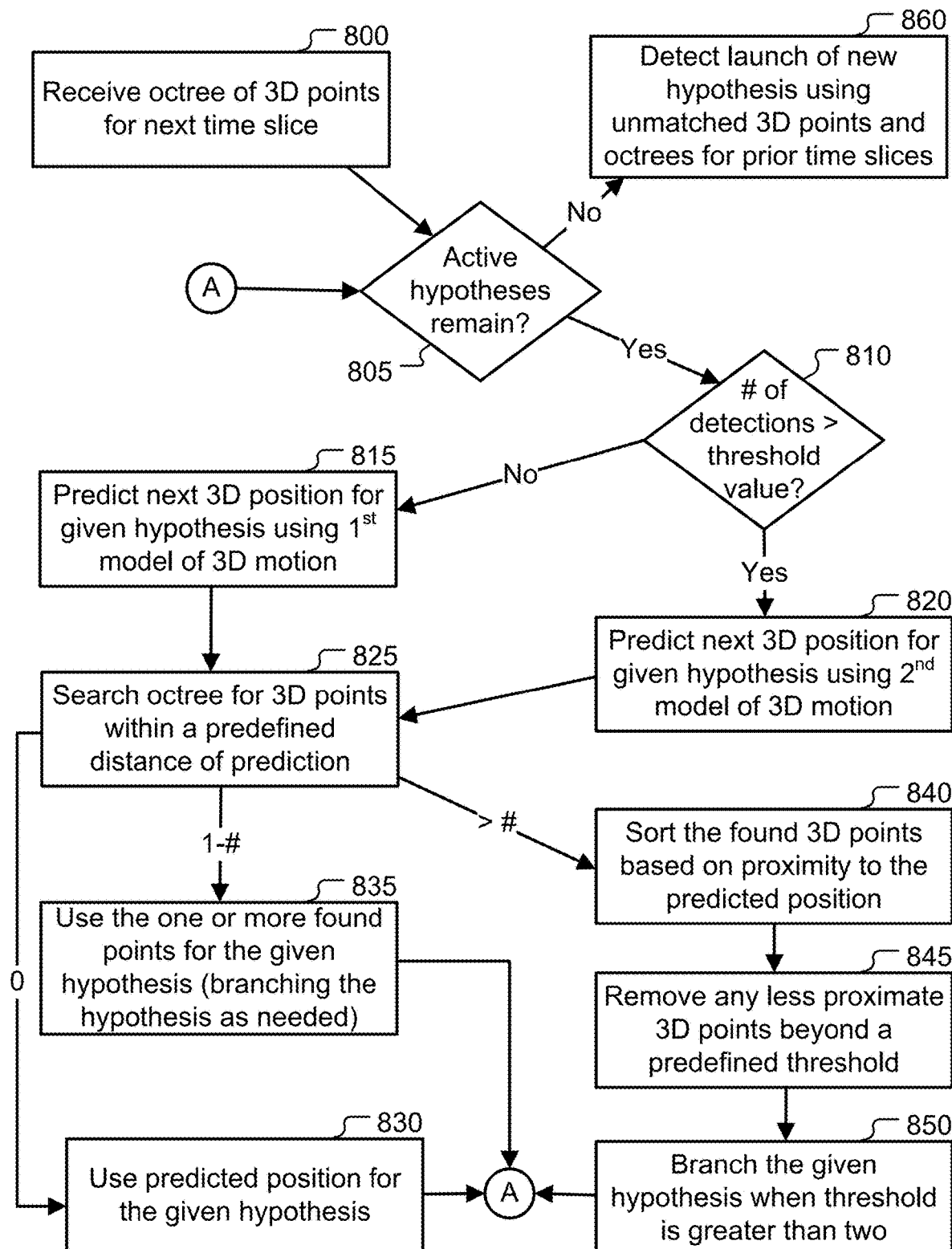
FIG. 8 shows an example of a process of hypothesis formation, which can be used in the 3D object tracking process of FIG. 7.

FIG. 8 shows an example of a process of hypothesis formation, which can be used in the 3D object tracking process of FIG. 7. The 3D positions of objects of interest registered by the object detection system for a next time slice are received 800. The 3D positions can be stored in an octree or another data structure. The octree data structure allows fast answers to queries such as "which points are x meters from point y?" In general, the received 3D positions data can be understood as a point cloud representing unverified objects in the 3D space at the given time slice. Further, the time slice can be one of multiple time slices at predefined increments of time, e.g., the predefined constant frame rate of the 3D tracking server referenced above.

A check 805 is made to determine if any active hypotheses remain to be processed using the 3D positions data of the current time slice. Each hypothesis can contain a model of the past and future trajectory of the hypothesis. For each active hypothesis that remains to be processed, a prediction can be made of where in the 3D space to find a next sensor registration of the potential object in motion that is represented by the given hypothesis, in accordance with the number of registered detections for the given hypothesis and a threshold value. Thus, a check 810 can be performed (like check 712 in FIG. 7) as to whether the number of object detections for the given hypothesis is greater than the threshold value. When the number of registered detections for the given hypothesis is less than or equal to the threshold value (or simply less than, which can be equivalent depending on the threshold value used), a next 3D position of the object is predicted 815 for given hypothesis using the first model. And when the number of registered detections for the given hypothesis is greater than the threshold value (or greater than or equal to, which can be equivalent depending on the threshold value used), a next 3D position of the object is predicted 820 for given hypothesis using the second model.

For example, for the first few observations of the hypothesis, a simple linear model can be used as the model over the flight of the ball. After a predefined number of observations have been made, a recurrent neural network (RNN) (or a suitable motion of second order complexity) can instead be used as the model over the flight of the ball. In some implementations, the predefined number of observations is ten, but other numbers can be used. In general, the predefined number should be set to a value that is less than the number of observations typically needed for a golf ball to start to show curved motion instead of linear motion, e.g., a number of sensor observations in the system that corresponds to about 0.3 seconds of ball flight, which is about at the edge before the ball shows curving motion.

In some implementations, the RNN only needs to make short-term predictions which allows the use of a less complex deep learning based model, e.g., a model architecture that is less wide and/or deep, which leads to faster predictions. For an RNN implementation, the predictions can be made from the last state of the model and several steps ahead can be predicted, even if not needed. These predictions need not update the model's state. In order to allow faster predictions, the predictions for all the hypotheses can be made in batches. In each batch, the predictions for multiple hypotheses can be done at the same time using vector instructions, Single Instruction Multiple Data (SIMD).

In some implementations, rather than use an RNN as the second model, e.g., after ten observations have been made, a more sophisticated physics model can be used. This physics model can be a traditional numeric physics model that uses numeric integration of measured aerodynamic properties, such as the drag, lift forces and spin decay of the ball. This physics model may be a full physics model or a reduced physics model that simplifies one or more aspects of ball flight in order to reduce processing time and thus speed up the predictions of the next 3D positions for the hypotheses. In some implementations, the state of the physics model, velocity and spin, is continuously updated during the time of the hypothesis. This can be performed by first selecting a subset of the observed 3D points towards the end of the hypothesis. These 3D points can be low-pass filtered and the 3D velocity and acceleration vectors can be calculated from the filtered data. Then an optimization can be formulated using the selected physics model and solved for the 3D spin vector of the ball. Numerical integration can then be applied to the estimated 3D velocity and spin vectors to arrive at a predicted location for the object in the current time slice.

Using the predicted location enables a more rapid search of the 3D positions data for the current time slice to find any registered objects of interest that can be used to extend the given hypothesis. For example, an octree data structure containing all of the 3D positions of objects of interest registered by the object detection system for this next time slice can be searched 825 to find a set of 3D positions within a predefined distance of the predicted next three-dimensional position. The octree can be queried for points close to the predicted position, where each 3D point can be determined to be "close" when the 3D point is within a predefined distance of the predicted position. Note that use of a data structure, such as an octree, that enables efficient (faster) searching among points in the 3D cloud of points for the current time slice (such that there is no need to check all points in the cloud) is an important part of achieving real-time performance even though the 3D point cloud includes many false positives. Also note that spatial data structures other than an octree can be used, such as a K-D tree, to enable fast searches with these types of queries for points close to a predicted point for a current hypothesis.

Moreover, in some implementations, each 3D point is determined to be "close" only when the 3D point is both (1) within the predefined distance of the predicted position, and (2) indicates a move in the same general direction of the hypothesis. For example, each hypothesis can include an estimate of the current direction the ball is moving in (the estimated velocity vector), and a new direction vector can be computed based on the new potential 3D point and the same anchor point that was used to calculate the ball direction; then, the 3D point is accepted only if the angle between the current estimated direction and the new direction is less than or equal to 90 degree (i.e., a positive dot product). Note that this simple linear model of motion can be used to limit the 3D points that are considered for addition to a given hypothesis even when the second model is used to predict the next 3D position for the given hypothesis, as this provides a rapid way to exclude bad 3D points from consideration for extending the current hypothesis.

If the search 825 returns zero (0) hits (i.e., the set is the null set) the 3D position that was predicted for the given hypothesis can be used 830 to extend the given hypothesis through the current time slice, and the process then returns to checking 805 for a next active hypothesis to be processed. If the search 825 returns one (1) hit or some number (#) of hits that is less than or equal to a predefined threshold number that controls the number of branches allowed for each hypothesis at each time slice (e.g., a branching threshold number greater than two, where the branching number can be programmable) then the one or more found 3D points are used 835 to extend the given hypothesis (branching the hypothesis as needed), and the process then returns to checking 805 for a next active hypothesis to be processed.

When the set of 3D points returned by the search 825 contains a number of 3D points greater than the branching threshold number (#) the found 3D points can be sorted 840 based on proximity to the predicted next 3D position to form a sorted set. For example, the 3D points can be scored according to the squared L2 distance with the predicted position, e.g., during the search 825, and then ranked 840. Any less proximate 3D points in the sorted set beyond the predefined branching threshold number can be removed 845. Then, the given hypothesis is branched 850 into two or more hypotheses in a group of hypotheses using the two or more 3D points remaining in the sorted set. The process then returns to checking 805 for a next active hypothesis to be processed. Also, note that even though the set of hypotheses that are branches from an initial hypothesis can be stored as a group, each hypothesis branch can be tracked individually and pruned back to the branching point when that hypothesis dies.

While hypotheses remain 805 to be checked, the process repeats. However, it should be appreciated that even though the flowchart is shown as being sequential per hypothesis, in some implementations, the hypothesis are checked in parallel. Thus, the predictions 815, 820 can be made for all the active hypotheses before an octree is searched 825 for 3D points close to the predicted positions, etc. In any case, all the 3D positions of objects of interest registered by the object detection system for the current time slice that are not added to an existing hypothesis can be added to a list of unmatched 3D points for further processing. In addition, in some implementations, if a hypothesis dies quickly (e.g., before the hypothesis grows to three or more, or four or more, or five or more object detections) the 3D points (corresponding to sensor impressions) used in the dead hypothesis can be added to the list of unmatched points in order to reduce the risk that a new ball launch will be missed by having its sensor impressions get "stolen" by a hypothesis that goes nowhere.

Further, note that regardless of the nature of the second model used (e.g., the RNN model or the numeric integration physics model) the updating of each hypothesis can be delayed. When the work for a hypothesis in the current time slice is done, the second model is updated. If a new point has been added, then that is used to update the model. If not, then the model's prediction of the position is used instead. In both cases, the update can be "delayed". When a new point is added, it need not be immediately used to update the model. This is because the raw 3D observations are somewhat noisy, which could confuse the model. This delaying work can be done as follows: the position that would be used to update the model lags behind the last added position by some number of frames. When the point is used to update the model, it can be smoothed by both positions before and after the point. In some implementations, a window size of nine is used, meaning four points behind and four points ahead are needed before the model is updated. Special handling is made to the first part of the trajectory in such implementations.

The 3D positions that are not matched to an existing hypothesis are used to detect 860 a potential new ball and thus launch a new hypothesis. This can involve using the octree(s) for the current time slice and additional octrees stored for prior time slices. To decrease the number of potential launches (especially for launches that would be in the same vicinity), points that are closer to each other than half a meter can be made into a cluster and the point with the lowest measurement error, such as the re-projection error for stereo camera sensors, can be kept in the cluster. The remaining points are added to the octree. In some implementations, the octrees for the two previous time slices are also kept.

In some implementations, the clustering involves (for each point) finding the points that are less than a threshold distance (e.g., 2 meters or one meter) away. These points will be considered a cluster, and if a point belongs to more than one cluster, the two clusters can be merged into one. Thus, a cluster will be a set of points that are close, and so these points can correspond to the same object. In order to avoid creating more than one launch in the system for the same object, the set of points in each cluster is reduced to one point, and the metric that is used to do this can be the re-projection error, such that the point with the lowest re-projection is chosen to the be point that represents the cluster. In some implementations, a new point cloud is created with the individual points representing the identified clusters, and this new point cloud (1) should contain fewer points than the original point cloud for this time slice, and (2) can be used for detecting launches (and only launches). Note that the new point cloud can also be stored in a spatial data structure, such as an octree, to enable faster searches to facilitate real-time launch detections.

The launch detection 860 can be designed to find movement that is generally linear (that is, in a line). In some implementations, this is done by iterating over all remaining 3D points and searching for 3D points that are close (e.g., within 5 meters) in the octree from two time slices ago. A line is then calculated between these two points. This line can then be verified by predicting the position of the ball in the time slice between these two points, and searching the octree in the previous time slice for a 3D point that lies close to this predicted position. If all of these criteria fulfilled, then a new hypothesis will be created 860 containing these three points.

In addition, as noted above, the forming of hypotheses 710 can include dividing 718 the hypotheses into distinct segments. Through the duration of a ball's motion in 3D space, e.g., through the duration of a golf shot, the motion enters different phases, or segments, such as flight, first bounce, second bounce, roll, etc. Depending on which segment the shot is in, the physics model can be different. That is, the physics model/parameters used for a flight segment can be different than the physics model/parameters used for a roll segment, which can be different than the physics model/parameters used for a skid segment. In addition, there can be practical benefits of switching the physics/prediction model and/or parameter(s) used depending on which segment the shot is in, e.g., not using the same algorithm both for bounce and flight, as the bounce will typically have higher noise but much less noticeable Magnus effect.

Figure 9:
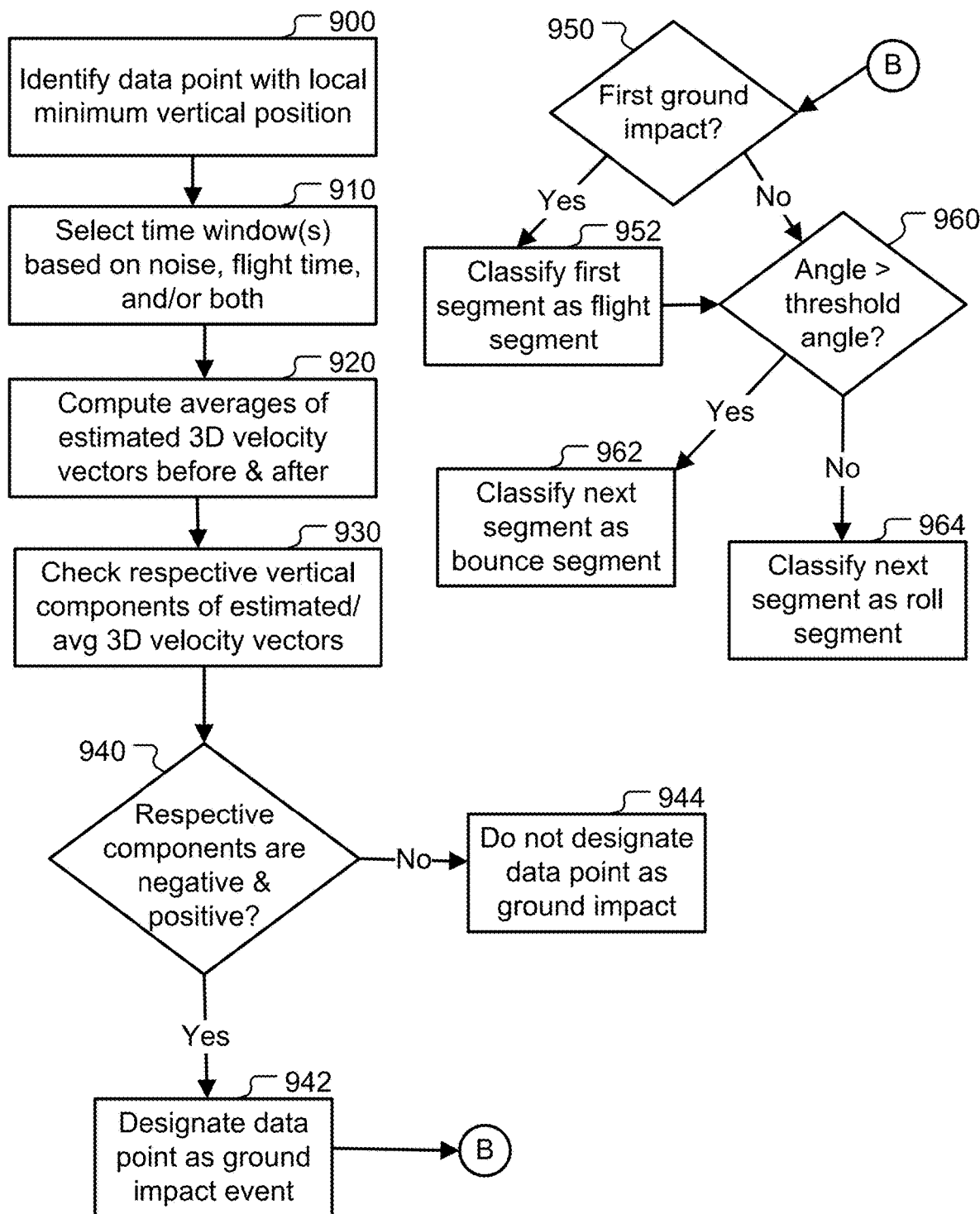
FIG. 9 shows an example of a process of dividing a hypothesis into distinct segments during hypothesis formation, which can be used in the 3D object tracking process of FIG. 7.

The process for dividing 718 an object's motion into such segments can be performed after all the extensions have been made for the currently active hypotheses for the current time slice, or after each hypothesis is extended. For example, each time a new point is added to a hypothesis, a decision can be made as whether or not this point starts a new segment. FIG. 9 shows an example of a process of dividing 718 a hypothesis into distinct segments during hypothesis formation, which can be used in the 3D object tracking process of FIG. 7. A data point in a given hypothesis is identified 900, where that data points has a local minimum vertical position.

For example, if a new 3D position $Pt_{x,y,z}$ is added to a hypothesis for time slice t, a check can be made against two prior 3D positions $P(t-1)_{x,y,z}$ and $P(t-2)_{x,y,z}$ to see if the Y component $P(t-1)_y < P(t-2)_y$ and the Y component $P(t-1)_y < Pt_y$. Note that the Y component here refers to the vertical position of the 3D points in a 3D coordinate system in which the "Y" position refers to the coordinate axis that defines height above/below the ground level. Thus, the local minimum of Y positions in 3D space indicates a possible impact with the ground. While other approaches to finding a local minimum vertical position can be used, this approach has the advantage of being very quick and easy to determine. However, due to the noise in the system, the number of false positives, and the risk that the ball may not be detected by any sensor in a given time slice (note that the 3D data point identified as a minimum vertical position in the hypothesis can be a predicted 3D point, rather than a registered detection, when no detection was registered at this time slice) another check is needed to confirm this represents a ground impact.

Respective vertical components of the estimated 3D velocity vectors before and after the data point are checked 930 in the given hypothesis. For example, the Y (vertical) component of the vector $P(t-2)_{x,y,z} \rightarrow P(t-1)_{x,y,z}$ and the Y (vertical) component of the vector $P(t-1)_{x,y,z} \rightarrow Pt_{x,y,z}$ can be checked to see if the first is negative (or positive in a reversed coordinate axis; in any case, a sign indicating the object is heading toward the ground after the data point $P(t-1)_{x,y,z}$) and the second is positive (or negative in a reversed coordinate axis; in any case, a sign indicating the object is heading away from the ground after the data point $P(t-1)_{x,y,z}$). If so, the data point is designated 942 as a ground impact event, and if not, the data point is not designated 944 as a ground impact event.

In some implementations, more than just two estimated velocity vectors are checked in order to overcome the risks created by noise in the system. Two or more estimated velocities both before and after the minimum vertical position data point can be averaged, and then the vertical (e.g., Y) components of the respective velocity vector averages can be checked 930. While this can delay the identification of the ground impact by a number of time slices equal to one less than the number of velocity vectors that are averaged after the potential ground impact, this delay provides the corresponding advantage of a more robust ground impact detection using the noisy data. This can facilitate using less advanced sensor technology in the system, thus reducing the costs of the system overall.

Further, in some implementations, one or more time windows can be selected 910 based on a noise level associated with the estimated 3D velocity vectors, a minimum expected flight time on one or both sides of the data point, or both the noise level and the minimum expected flight time. The averages of the estimated 3D velocity vectors before and after the data point can then be computed using the velocity vectors that fall within the at least one time window on either side of the data point that is the potential ground impact. In some cases, a single averaging window is used, and in some cases, two averaging windows are used, where the averaging window used before the data point can be a different length than the averaging window used after the data point.

Moreover, while shown in the figure as being included in the dividing process itself, rather than selecting 910 the time window(s) dynamically (e.g., in real time) while the hypotheses are being formed, the selecting 910 can be done periodically, e.g., outside of the processing loop, or potentially just once for a given system setup having a specific set of sensors 130 arranged for a given 3D space 110, e.g., the window(s) can be selected 910 based on the nature of the sensor(s) 130 used in the system, and whether those sensor(s) 130 are located on one side, two sides, three sides, or all sides of the 3D space 110. Moreover, when more advance sensor technology is used in the system, e.g., more accurate sensors 110 and/or a higher data capture rate, additional checks of the vertical component of velocity can be used, such as checking whether the Y component of one or more velocity vectors are within a small range around zero to help confirm that the ball is in a roll segment, or checking whether the rate of change of the Y component of a rolling average of velocity vectors is within a small range around Earth's gravitational constant, G, to confirm the ball is in a flight segment or a bounce segment.

In any case, once a ground impact is designated 942, a new segment is specified for the hypothesis, and a decision is taken as to whether this new segment is a bounce segment or a roll segment in relation to the prior segment. If the designated ground impact is the first ground impact 950 designated for the given hypothesis, then this ground impact divides the hypothesis into two segments, and the segment before the ground impact is classified 952 as a flight segment, e.g., corresponding to the initial portion of the golf shot. Then a check 960 can be made to determine the nature of the segment after the ground impact. In some implementations, the check 960 involves determining whether or not an angle between a first estimated velocity vector (e.g., an average velocity vector) before the designated ground impact and a second estimated velocity vector (e.g., an average velocity vector) after the designated ground impact is greater than a threshold angle (e.g., 20 degrees). If so, the segment after the ground impact is classified 962 as a bounce segment. If not, the segment after the ground impact is classified 964 as a roll segment.

In some implementations, the threshold angle between the estimated velocity vectors is a programmable parameter that can be adjusted experimentally for a given implementation after deployment. In some implementations, if the prior segment is a roll segment, then the next segment cannot be a bounce segment. This logic will lead to "small" bounces being identified as rolling, but the purpose is not to propagate this information to the consumer of the tracking data, but rather to alter the tracking behavior, as described in further detail below. In some implementations, the roll segment can be a true roll or a skid, depending on the rotational component of the ball as it moves along the ground. Finally, note that a skid is typically followed by a roll, and the system can track the ball until it comes to a stop (or at least until the ball's speed is less than a threshold value) and any detections of the stopped ball can be discarded.

Returning to FIG. 7, hypotheses that are not further extended by connections made, during the forming 710, with at least one additional object of interest registered by the object detection system are eliminated 720. For example, a hypothesis can be marked as dead when the potential ball has been missing for more than x number of time slices, where x is set to different values depending on how many observations have been made. In some implementations, x is set to three (3) for hypothesis with less than ten (10)

observations and twenty (20) otherwise. Other values for x for hypotheses with different numbers of observations in them can be used, depending on the system and the frequency of sensor observations. Also, when all hypotheses in a group are dead, the whole group is marked as dead. In any case, over time, the false hypotheses are killed relatively quickly because the false detections and/or pairings (e.g., a 3D position generated from data from two sensors, whether camera or radar, that have been determined as potentially being detections of the same object) are distributed randomly across a relatively large 3D space; due to the size of the volume of space, it is highly unlikely to find a pattern of false detections and/or pairings that match the motion of a golf ball in space.

Some hypotheses will survive the elimination 720, and so at least one 3D track of at least one ball in motion in three-dimensional space will be specified 730 by applying a full three-dimensional physics model to data for the 3D positions of the registered objects of interest used in the forming 710 of at least one hypothesis that survives the eliminating 720. In some implementations, at each time slice, the best hypothesis (or a set of active hypotheses that satisfy a predefined criterial) is selected based on a scoring function that looks at the hypothesis size and one or more characteristics of the sensor data, e.g., the blob contrast, and these one or more hypotheses are then used to specify 730 at least one 3D track of a ball in motion, e.g., after determining a more accurate 3D path in accordance with segmenting performed during the forming 710, e.g., based on local minimums in vertical position and expected average vertical components of the estimated 3D velocity vectors before and after the local minimums.

Figure 10A:
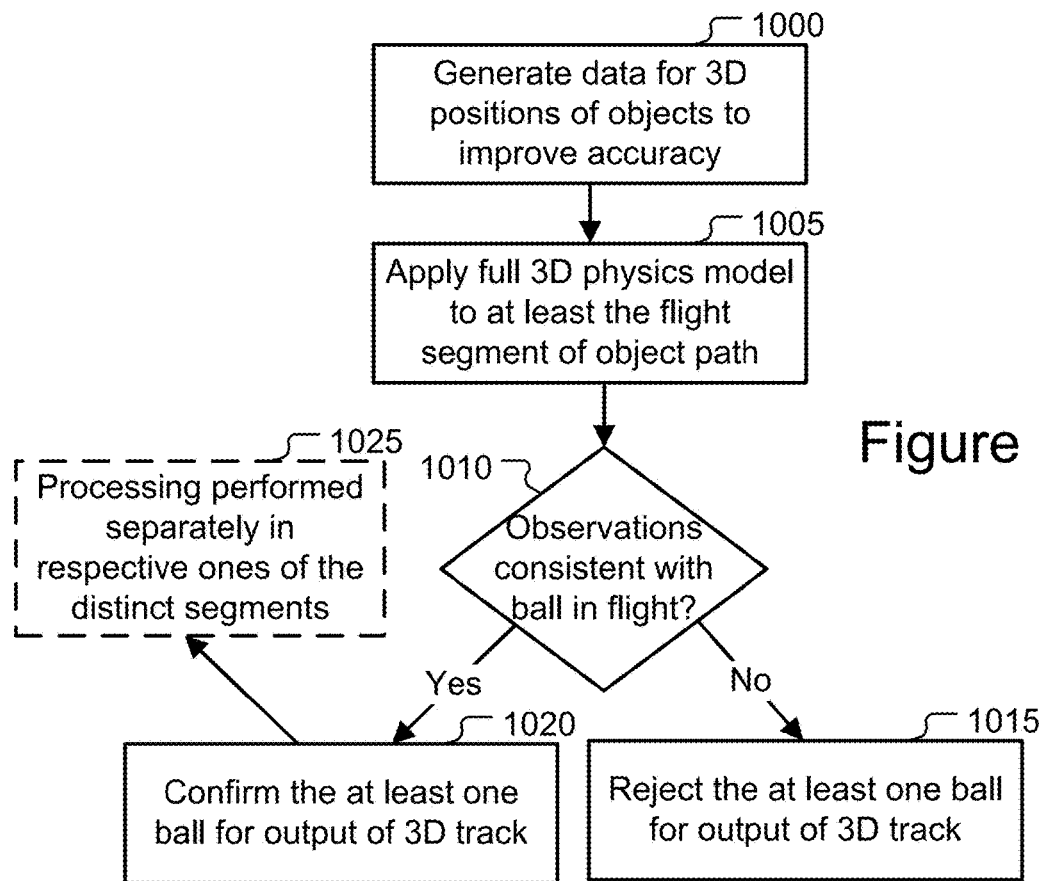
FIGS. 10A & 10B show examples of a process of specifying a 3D track of a ball in motion, which can be used in the 3D object tracking process of FIG. 7.

FIG. 10A shows an example of a process of specifying a 3D track of a ball in motion, which can be used in the 3D object tracking process of FIG. 7. The data for the three-dimensional positions of the registered objects used in the forming of the at least one hypothesis can be generated 1000 by processing the sensor data to produce a more accurate 3D path using sensor observations registered by the object detection system in at least the flight segment. This can involve processing the sensor data to remove outliers and to smooth the data, followed by re-combining the processed sensor data to form 3D positions in a 3D path with much less noise than the raw 3D combinations (used during hypothesis formation) can give. For example, in the case of two cameras combined in a stereo pair, this involves performing triangulation again based on the smoothed 2D observations.

The 3D path is then analyzed to make the final decision if this is a golf ball or not. A full three-dimensional physics model can be applied 1005 to the generated data for at least the flight segment. The full 3D physics model can estimate the spin of the ball, and any balls with spin numbers that are too high can be discarded. If the sensor observations (after the processing 1000) are found 1010 to be inconsistent with a ball in flight according to the applied 1005 full physics model, the data is rejected 1015 for output. If the sensor observations (after the processing 1000) are found 1010 to be consistent with a ball in flight according to the applied 1005 full physics model, the data is confirmed 1020 for output.

In addition, only paths that move smoothly (small angle changes between each point) are accepted in some implementations. This additional constraint is needed for cases when the spin (acceleration) is low, but the object does not move in a smooth way (which golf balls do). In addition, the paths can be accepted or rejected in full, rather than accepting or rejecting individual segments within a path. Nonetheless, individual points can be rejected for being outliers. Further, in some implementations, portions of the paths that have an inordinate number of outliers in the data points can be identified as bad and be thrown out.

Figure 10B:
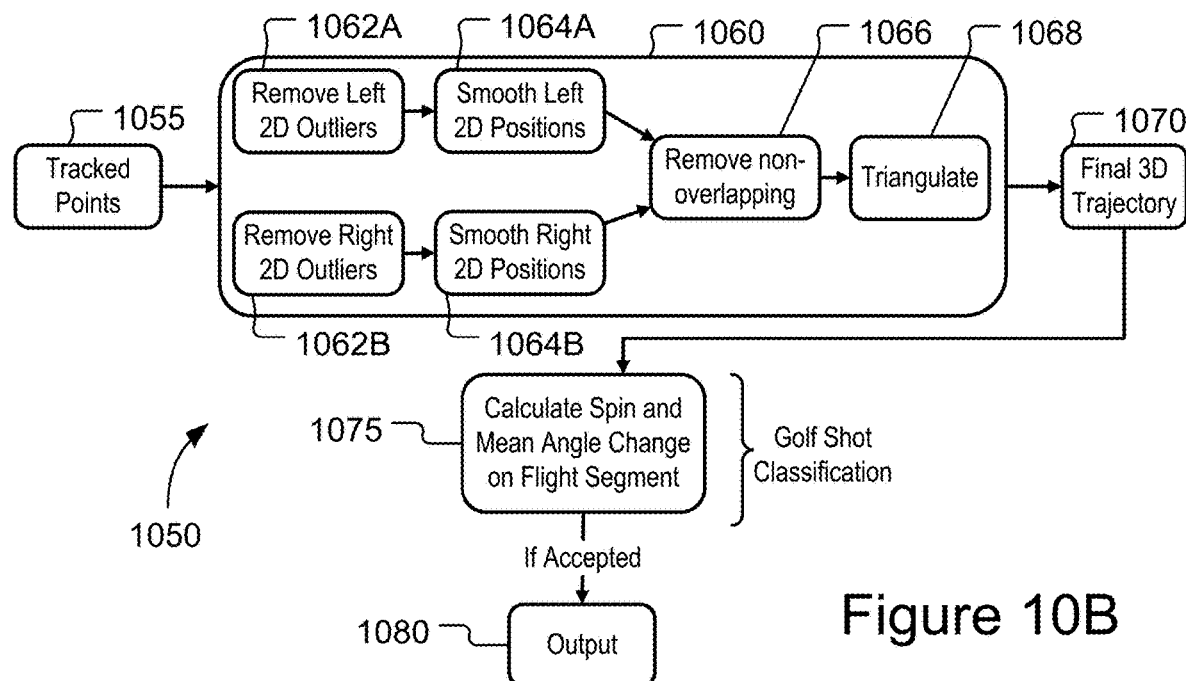

FIG. 10B shows a detailed example 1050 of a process of specifying a 3D track of a ball in motion, which can be used in the 3D object tracking process of FIG. 7. This example corresponds to the case of two cameras combined in a stereo pair, but the process can be applied more generally to the combination of data from any two suitable sensors. Tracked points 1055 are received by a post-hypothesis process 1060 that recombines the processed sensor data to form 3D positions in a 3D path with much less noise than the raw 3D combinations used during hypothesis formation. The 2D outliers in the data (for the ball track) from the left camera (in the stereo pair) are removed 1062A, and the 2D outliers in the data (for the ball track) from the right camera (in the stereo pair) are removed 1062B. The remaining 2D positions in the data (for the ball track) from the left camera are smoothed 1064A, and the remaining 2D positions in the data (for the ball track) from the right camera are smoothed 1064B. Note that the smoothing can involve low-pass filtering, such as described above.

Any non-overlapping data points are removed 1066. Because the outliers are removed 1062A, 1062B independently for the two cameras, it can happen in some cases that only one of the two camera observations of the ball is considered to be an outlier, which leads to one of the cameras having a detection while other camera does not. So these points in time that only have one detection are removed. Then, the remaining data points (for the ball track) from the right and left cameras are triangulated 1068. This can produce a new set of 3D points, which can then be used to form 1070 a final 3D trajectory that is a more accurate representation of the actual path of the object in 3D space.

As noted, the process of FIG. 10B can be applied more generally to the combination of data from any two suitable sensors. In general, when the tracking phase for a given ball is completed 1055, all the detections for that ball can be used to refine 1060 the tracked trajectory. Thus, positional data that comes later in the trajectory can be used to refine the positional data that comes earlier in the trajectory. In the case of data from a camera plus radar, the camera data can be processed as described above, and the radar data can be processed using low-pass filtering and outlier detection to increase the quality of the radar data.

In addition, a final golf shot classification operation can calculate 1075 spin and mean angle change on at least the flight segment of the 3D path of the object to confirm that it is a golf ball. A determining characteristic of the trajectory of a golf ball is the effect that the spin has on it in free flight. Thus, estimating the spin rate of the ball from the observed (flight) segment of the ball helps in determining if the trajectory of the object is a golf ball or not, as a non-golf ball object can produce an unreasonably high spin rate. Reasonable values for the spin of a golf ball are between 0 and 16000 revolutions per minute (RPM) with some slack being included for inaccuracies in the estimates.

In addition, when the estimated spin is very low for a non-golf ball object, this can be detected with the additional test of the mean angle change, which is about the smoothness of the motion. A golf ball should have a smooth motion through the air, so objects that do not have this smooth motion in the flight segment of their trajectory should be discarded. For each point in the 3D path, the direction vector between that point and the previous point can be calculated. Then, this direction vector can be compared against the direction vector for the previous point in the 3D path, and the angle between the two vectors can be calculated. The arithmetic mean (average) over two or more of these angles (e.g., all the angles in the flight segment) can be calculated 1075, and a high mean value (e.g., greater than 10 degrees) indicates that the object has jagged (rapid change of) motion, which is not the expected motion of a golf ball.

In such cases, the tracked object is rejected as not being a golf ball. If the object is accepted as a golf ball (or another type of object being tracked in a given implementation) then the 3D path of the ball is output 1080 for processing by another system/process and/or for display, e.g., for a video game or TV broadcast. Note that the 10 degree threshold for the average of the point-to-point directional vectors is but one example, and different threshold values can be used in different implementations. In general, the threshold depends on the capture frequency of the sensor(s) since a higher data capture rate allows the threshold to be smaller, as the potential object in free flight motion moves less distance between each detection point. In some implementations, the threshold for the average of the directional vectors is a programmable parameter that can be adjusted experimentally for a given implementation after deployment.

Returning to FIG. 10A, in some implementations, processing is performed 1025 separately in respective ones of the distinct segments. This processing 1025 can be part of the processing done to generate 1000 the data for ball confirmation. For example, based on the path segmentation made during the 3D tracking, the trajectory can be segmented, and in each segment, the observations can be smoothed and outliers removed. Then combination (e.g., triangulation) can be performed again based on the smooth observations to produce the 3D path with less noise in the data. Note that the observations (e.g., the 2D observations from paired cameras) are smoothed within the segment as opposed to doing smoothing over the entire trajectory, as else the bounce point would be "smoothed" out and loose it's sharp edge. Note that by performing the smoothing separately for the pieces before and after the bounce, the sharp edge of the bounce point is preserved, and in some implementations, a more precise 3D position for each bounce point can be determined based on the 3D paths on either side of the identified bounce point, e.g., by extrapolating the two smoothed segments; note that the finite sampling speed of the sensors means that the exact moment of the ball bounce may not be captured, so seeking the intersection in space between the (extrapolated) path segments before and after the bounce may be the only way to estimate the actual bounce position.

As another example, the processing 1025 can be performed separately in respective ones of the distinct segments after the data has been confirmed 1020 for output. This processing 1025 can employ different techniques in the respective segments to confirm key points in the 3D path, such as a precise 3D location of each bounce point and a precise 3D location of the final resting point for the ball. The different techniques employed in the respective segments can include different low pass filtering techniques, different data smoothing techniques, and/or different ball motion modeling techniques.

In any case, the distinct segments stay associated with each other as being part of the same ball's trajectory, and the final path data made available for output can include data for each of the different identified segments, only a portion of the identified segments (e.g., only the flight segment), and/or key identified points for the identified segments (e.g., a 3D location of each bounce point and a 3D location of the final resting point for the ball).

Once a 3D path fulfills all the necessary criteria to confirm it is a true object in motion, e.g., a real golf ball shot, then the final path data is sent as output. Referring again to FIG. 7, the 3D track of the detected ball is output 740 for generation of a representation of the 3D track, or generating and displaying 740 the representation of the 3D track in 3D space. This can involve further processing of the 3D track to effectively display it by overlaying a trace of a golf ball in a TV signal produced for live transmission, or for recording, or this can involve further processing of the 3D track to effectively display it by augmenting other data or media, such as by showing a path of a golf ball in a computer representation of a physical environment in which a golfer is located, or in a virtual environment that exists only in the computer but is displayed to a user of the system, e.g., a virtual environment that is shared between participants in a multi-player game (either locally on the same range or scattered across the globe). Further, it should be noted that the processes shown in FIGS. 7-10B are presented as sequential operations for ease of understanding, but in practice, the operations can be performed in parallel or concurrently, e.g., using hardware and/or operating system based multitasking, and/or using pipelining techniques. Thus, the disclosure presented in this document in connection with the figures is not limited to sequentially performing the operations, as depicted in the figures, except where the processes performed require sequential operation with respect to specific inputs and outputs.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The non-transitory computer-readable medium can be a manufactured product, such as hard drive in a computer system or an optical disc sold through retail channels, or an embedded system. The non-transitory computer-readable medium can be acquired separately and later encoded with the one or more modules of computer program instructions, such as by delivery of the one or more modules of computer program instructions over a wired or wireless network. The non-transitory computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and one or more processors of any suitable kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; CD-ROM and DVD-ROM disks; network attached storage; and various forms of cloud storage. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be sensory feedback, e.g., visual feedback, auditory feedback, or tactile feedback; and input from the user can be received in various forms, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any suitable combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the embodiment described above can be combined with any of the other features of the embodiment described above.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the description above focuses on tracking the motion of a golf ball, but the systems and techniques described are also applicable to other types of object motion tracking, such as for baseball or skeet shooting, as well as non-sports applications. Further, tracking an object "in motion" can include tracking the object when it bounces off and/or rolls along the ground, in some implementations.

What is claimed is:

1. A method comprising:
obtaining three-dimensional positions of objects of interest registered by an object detection system configured to allow more false positives for the registered objects of interest so as to minimize false negatives;
forming hypotheses of objects in motion in three-dimensional space using a filter applied to the three-dimensional positions of the registered objects of interest, wherein the filter allows connections between specific ones of the registered objects of interest when estimated three-dimensional velocity vectors for the specific objects of interest roughly correspond to an object in motion in three-dimensional space across time;
eliminating a proper subset of the hypotheses that are not further extended by connections made, during the forming, with at least one additional object of interest registered by the object detection system;
specifying at least one three-dimensional track of at least one ball in motion in three-dimensional space by applying a full three-dimensional physics model to data for the three-dimensional positions of the registered objects of interest used in the forming of at least one hypothesis that survives the eliminating; and
outputting for display the at least one three-dimensional track of the at least one ball in motion in three-dimensional space;
wherein forming the hypotheses of objects in motion in three-dimensional space using the filter comprises:
using a first model of motion in three-dimensional space when a number of registered detections for a given hypothesis is less than a threshold value, wherein the first model has a first level of complexity; and
using a second model of motion in three-dimensional space when the number of registered detections for the given hypothesis is greater than or equal to the threshold value, wherein the second model has a second level of complexity that is greater than the first level of complexity of the first model.

2. The method of claim 1, wherein the first model of motion in three-dimensional space is a linear model that connects a first three-dimensional position of a registered object of interest to the given hypothesis when the first three-dimensional position extends the given hypothesis in roughly a same direction predicted by the given hypothesis, and the second model of motion in three-dimensional space is a recurrent neural network model that has been trained to make short term predictions of motion in three-dimensional space.

3. The method of claim 1, wherein forming the hypotheses of objects in motion in three-dimensional space comprises:
predicting a next three-dimensional position for a registered detection for the given hypothesis using the first model or the second model, in accordance with the number of registered detections for the given hypothesis and the threshold value;
searching a spatial data structure containing all of the three-dimensional positions of objects of interest registered by the object detection system for a next time slice to find a set of three-dimensional positions within a predefined distance of the predicted next three-dimensional position;
using the predicted next three-dimensional position for the given hypothesis when the set of three-dimensional positions is a null set;
using a single three-dimensional position for the given hypothesis when the set of three-dimensional positions contains only the single three-dimensional position; and
when the set of three-dimensional positions contains two or more three-dimensional positions,
sorting the two or more three-dimensional positions based on proximity to the predicted next three-dimensional position to form a sorted set,
removing any less proximate three-dimensional positions in the sorted set beyond a predefined threshold number greater than two, and
branching the given hypothesis into two or more hypotheses in a group of hypotheses using the two or more three-dimensional positions remaining in the sorted set.

4. The method of claim 1, wherein forming the hypotheses of objects in motion in three-dimensional space when the number of registered detections for the given hypothesis is greater than or equal to the threshold value comprises:
identifying a data point in the given hypothesis that has a local minimum vertical position;
checking respective vertical components of estimated three-dimensional velocity vectors before and after the data point in the given hypothesis; and
designating the data point as a ground impact when a first of the respective vertical components is negative and a second of the respective vertical components is positive.

5. The method of claim 4, wherein the respective vertical components are from averages of the estimated three-dimensional velocity vectors before and after the data point in the given hypothesis, and the method comprises:
selecting at least one time window based on a noise level associated with the estimated three-dimensional velocity vectors, a minimum expected flight time on one or both sides of the data point, or both the noise level and the minimum expected flight time; and
computing the averages of the estimated three-dimensional velocity vectors before and after the data point that fall within the at least one time window.

6. The method of claim 4, wherein forming the hypotheses of objects in motion in three-dimensional space when the number of registered detections for the given hypothesis is greater than or equal to the threshold value comprises dividing the given hypothesis into distinct segments comprising a flight segment, one or more bounce segments, and a roll segment, and the dividing comprises the identifying, the checking, the designating, and:
classifying a first segment of the given hypothesis before a first designated ground impact as the flight segment;
classifying a next segment of the given hypothesis after each next designated ground impact as one of the one or more bounce segments when an angle between a first estimated velocity vector before the next designated ground impact and a second estimated velocity vector after the next designated ground impact is greater than a threshold angle; and
classifying the next segment of the given hypothesis after a next designated ground impact as the roll segment when the angle between the first estimated velocity vector before the next designated ground impact and the second estimated velocity vector after the next designated ground impact is less than or equal to the threshold angle.

7. The method of claim 6, wherein the given hypothesis is the at least one hypothesis that survives the eliminating, and specifying the at least one three-dimensional track of the at least one ball in motion in three-dimensional space comprises:
generating the data for the three-dimensional positions of the registered objects used in the forming of the at least one hypothesis by triangulating a more accurate 3D path using sensor observations registered by the object detection system in at least the flight segment; and
confirming the at least one ball in motion by applying the full three-dimensional physics model to the generated data for at least the flight segment.

8. The method of claim 1, wherein the obtaining comprises receiving or generating the three-dimensional positions of the registered objects of interest in which a majority of the registered objects of interest are false positives including false detections by individual sensors and false combinations of detections from respective ones of the individual sensors.

9. The method of claim 8, wherein the individual sensors comprise three or more sensors, and the obtaining comprises generating the three-dimensional positions by making respective combinations of the detections from respective pairs of the three or more sensors for a current time slice.

10. The method of claim 9, wherein the three or more sensors comprise two cameras and a radar device, and the making comprises:
combining detections of a single object of interest by the two cameras using a stereo pairing of the two cameras to generate a first three-dimensional position of the single object of interest; and
combining detections of the single object of interest by the radar device and at least one of the two cameras to generate a second three-dimensional position of the single object of interest.

11. The method of claim 10, wherein the three or more sensors comprise an additional camera, and the making comprises combining detections of the single object of interest by the additional camera and the two cameras using stereo pairings of the additional camera with each of the two cameras to generate a third three-dimensional position of the single object of interest and a fourth three-dimensional position of the single object of interest.

12. A system comprising:
two or more sensors and one or more first computers of an object detection system configured to register objects of interest and to allow more false positives for the registered objects of interest so as to minimize false negatives; and
one or more second computers configured to perform operations comprising
obtaining three-dimensional positions of objects of interest registered by the object detection system,
forming hypotheses of objects in motion in three-dimensional space using a filter applied to the three-dimensional positions of the registered objects of interest, wherein the filter allows connections between specific ones of the registered objects of interest when estimated three-dimensional velocity vectors for the specific objects of interest roughly correspond to an object in motion in three-dimensional space across time,
eliminating a proper subset of the hypotheses that are not further extended by connections made, during the forming, with at least one additional object of interest registered by the object detection system,
specifying at least one three-dimensional track of at least one ball in motion in three-dimensional space by applying a full three-dimensional physics model to data for the three-dimensional positions of the registered objects of interest used in the forming of at least one hypothesis that survives the eliminating, and
outputting for display the at least one three-dimensional track of the at least one ball in motion in three-dimensional space;
wherein forming the hypotheses of objects in motion in three-dimensional space using the filter comprises:
using a first model of motion in three-dimensional space when a number of registered detections for a given hypothesis is less than a threshold value, wherein the first model has a first level of complexity; and
using a second model of motion in three-dimensional space when the number of registered detections for the given hypothesis is greater than or equal to the threshold value, wherein the second model has a second level of complexity that is greater than the first level of complexity of the first model.

13. The system of claim 12, wherein the two or more sensors comprise cameras and at least one radar device.

14. The system of claim 12, wherein the two or more sensors comprise a hybrid camera-radar sensor.

15. The system of claim 12, wherein the first model of motion in three-dimensional space is a linear model that connects a first three-dimensional position of a registered object of interest to the given hypothesis when the first three-dimensional position extends the given hypothesis in roughly a same direction predicted by the given hypothesis, and the second model of motion in three-dimensional space is a recurrent neural network model that has been trained to make short term predictions of motion in three-dimensional space.

16. The system of claim 12, wherein forming the hypotheses of objects in motion in three-dimensional space comprises:
predicting a next three-dimensional position for a registered detection for the given hypothesis using the first model or the second model, in accordance with the number of registered detections for the given hypothesis and the threshold value;
searching a spatial data structure containing all of the three-dimensional positions of objects of interest registered by the object detection system for a next time slice to find a set of three-dimensional positions within a predefined distance of the predicted next three-dimensional position;
using the predicted next three-dimensional position for the given hypothesis when the set of three-dimensional positions is a null set;
using a single three-dimensional position for the given hypothesis when the set of three-dimensional positions contains only the single three-dimensional position; and
when the set of three-dimensional positions contains two or more three-dimensional positions,
sorting the two or more three-dimensional positions based on proximity to the predicted next three-dimensional position to form a sorted set, removing any less proximate three-dimensional positions in the sorted set beyond a predefined threshold number greater than two, and branching the given hypothesis into two or more hypotheses in a group of hypotheses using the two or more three-dimensional positions remaining in the sorted set.

17. The system of claim 12, wherein forming the hypotheses of objects in motion in three-dimensional space when the number of registered detections for the given hypothesis is greater than or equal to the threshold value comprises:

identifying a data point in the given hypothesis that has a local minimum vertical position;

checking respective vertical components of estimated three-dimensional velocity vectors before and after the data point in the given hypothesis; and designating the data point as a ground impact when a first of the respective vertical components is negative and a second of the respective vertical components is positive.

18. The system of claim 17, wherein the respective vertical components are from averages of the estimated three-dimensional velocity vectors before and after the data point in the given hypothesis, and the operations comprise:

selecting at least one time window based on a noise level associated with the estimated three-dimensional velocity vectors, a minimum expected flight time on one or both sides of the data point, or both the noise level and the minimum expected flight time; and computing the averages of the estimated three-dimensional velocity vectors before and after the data point that fall within the at least one time window.

19. The system of claim 17, wherein forming the hypotheses of objects in motion in three-dimensional space when the number of registered detections for the given hypothesis is greater than or equal to the threshold value comprises dividing the given hypothesis into distinct segments comprising a flight segment, one or more bounce segments, and a roll segment, and the dividing comprises the identifying, the checking, the designating, and:

classifying a first segment of the given hypothesis before a first designated ground impact as the flight segment;

classifying a next segment of the given hypothesis after each next designated ground impact as one of the one or more bounce segments when an angle between a first estimated velocity vector before the next designated ground impact and a second estimated velocity vector after the next designated ground impact is greater than a threshold angle; and classifying the next segment of the given hypothesis after a next designated ground impact as the roll segment when the angle between the first estimated velocity vector before the next designated ground impact and the second estimated velocity vector after the next designated ground impact is less than or equal to the threshold angle.

20. The system of claim 19, wherein the given hypothesis is the at least one hypothesis that survives the eliminating, and specifying the at least one three-dimensional track of the at least one ball in motion in three-dimensional space comprises:

generating the data for the three-dimensional positions of the registered objects used in the forming of the at least one hypothesis by triangulating a more accurate 3D path using sensor observations registered by the object detection system in at least the flight segment; and confirming the at least one ball in motion by applying the full three-dimensional physics model to the generated data for at least the flight segment.

21. The system of claim 12, wherein the obtaining comprises receiving or generating the three-dimensional positions of the registered objects of interest in which a majority of the registered objects of interest are false positives including false detections by individual ones of the two or more sensors and false combinations of detections from respective ones of the two or more sensors.

22. The system of claim 21, wherein the two or more sensors comprise three or more sensors, and the obtaining comprises generating the three-dimensional positions by making respective combinations of the detections from respective pairs of the three or more sensors for a current time slice.

23. The system of claim 22, wherein the three or more sensors comprise two cameras and a radar device, and the making comprises:

combining detections of a single object of interest by the two cameras using a stereo pairing of the two cameras to generate a first three-dimensional position of the single object of interest; and combining detections of the single object of interest by the radar device and at least one of the two cameras to generate a second three-dimensional position of the single object of interest.

24. The system of claim 23, wherein the three or more sensors comprise an additional camera, and the making comprises combining detections of the single object of interest by the additional camera and the two cameras using stereo pairings of the additional camera with each of the two cameras to generate a third three-dimensional position of the single object of interest and a fourth three-dimensional position of the single object of interest.

25. A non-transitory computer-readable medium encoding instructions that cause data processing apparatus associated with an object detection system comprising two or more sensors to perform operations comprising:

obtaining three-dimensional positions of objects of interest registered by the object detection system, which is configured to allow more false positives for the registered objects of interest so as to minimize false negatives;

forming hypotheses of objects in motion in three-dimensional space using a filter applied to the three-dimensional positions of the registered objects of interest, wherein the filter allows connections between specific ones of the registered objects of interest when estimated three-dimensional velocity vectors for the specific objects of interest roughly correspond to an object in motion in three-dimensional space across time;

eliminating a proper subset of the hypotheses that are not further extended by connections made, during the forming, with at least one additional object of interest registered by the object detection system;

specifying at least one three-dimensional track of at least one ball in motion in three-dimensional space by applying a full three-dimensional physics model to data for the three-dimensional positions of the registered objects of interest used in the forming of at least one hypothesis that survives the eliminating; and outputting for display the at least one three-dimensional track of the at least one ball in motion in three-dimensional space;

wherein forming the hypotheses of objects in motion in three-dimensional space using the filter comprises:

using a first model of motion in three-dimensional space when a number of registered detections for a given hypothesis is less than a threshold value, wherein the first model has a first level of complexity; and using a second model of motion in three-dimensional space when the number of registered detections for the given hypothesis is greater than or equal to the threshold value, wherein the second model has a second level of complexity that is greater than the first level of complexity of the first model.

26. The non-transitory computer-readable medium of claim 25, wherein the first model of motion in three-dimensional space is a linear model that connects a first three-dimensional position of a registered object of interest to the given hypothesis when the first three-dimensional position extends the given hypothesis in roughly a same direction predicted by the given hypothesis, and the second model of motion in three-dimensional space is a recurrent neural network model that has been trained to make short term predictions of motion in three-dimensional space.

27. The non-transitory computer-readable medium of claim 25, wherein forming the hypotheses of objects in motion in three-dimensional space comprises:

predicting a next three-dimensional position for a registered detection for the given hypothesis using the first model or the second model, in accordance with the number of registered detections for the given hypothesis and the threshold value;

searching a spatial data structure containing all of the three-dimensional positions of objects of interest registered by the object detection system for a next time slice to find a set of three-dimensional positions within a predefined distance of the predicted next three-dimensional position;

using the predicted next three-dimensional position for the given hypothesis when the set of three-dimensional positions is a null set;

using a single three-dimensional position for the given hypothesis when the set of three-dimensional positions contains only the single three-dimensional position; and when the set of three-dimensional positions contains two or more three-dimensional positions, sorting the two or more three-dimensional positions based on proximity to the predicted next three-dimensional position to form a sorted set, removing any less proximate three-dimensional positions in the sorted set beyond a predefined threshold number greater than two, and branching the given hypothesis into two or more hypotheses in a group of hypotheses using the two or more three-dimensional positions remaining in the sorted set.

28. The non-transitory computer-readable medium of claim 25, wherein forming the hypotheses of objects in motion in three-dimensional space when the number of registered detections for the given hypothesis is greater than or equal to the threshold value comprises:

identifying a data point in the given hypothesis that has a local minimum vertical position;

checking respective vertical components of estimated three-dimensional velocity vectors before and after the data point in the given hypothesis; and designating the data point as a ground impact when a first of the respective vertical components is negative and a second of the respective vertical components is positive.

29. The non-transitory computer-readable medium of claim 28, wherein the respective vertical components are from averages of the estimated three-dimensional velocity vectors before and after the data point in the given hypothesis, and the operations comprise:

selecting at least one time window based on a noise level associated with the estimated three-dimensional velocity vectors, a minimum expected flight time on one or both sides of the data point, or both the noise level and the minimum expected flight time; and computing the averages of the estimated three-dimensional velocity vectors before and after the data point that fall within the at least one time window.

30. The non-transitory computer-readable medium of claim 28, wherein forming the hypotheses of objects in motion in three-dimensional space when the number of registered detections for the given hypothesis is greater than or equal to the threshold value comprises dividing the given hypothesis into distinct segments comprising a flight segment, one or more bounce segments, and a roll segment, and the dividing comprises the identifying, the checking, the designating, and:

classifying a first segment of the given hypothesis before a first designated ground impact as the flight segment;

classifying a next segment of the given hypothesis after each next designated ground impact as one of the one or more bounce segments when an angle between a first estimated velocity vector before the next designated ground impact and a second estimated velocity vector after the next designated ground impact is greater than a threshold angle; and classifying the next segment of the given hypothesis after a next designated ground impact as the roll segment when the angle between the first estimated velocity vector before the next designated ground impact and the second estimated velocity vector after the next designated ground impact is less than or equal to the threshold angle.

* * * * *